US006818872B2

(12) United States Patent
Mitamura et al.

(10) Patent No.: US 6,818,872 B2
(45) Date of Patent: Nov. 16, 2004

(54) APPARATUS FOR HEATING A GREEN TIRE

(75) Inventors: Hisashi Mitamura, Takasago (JP);
Shigeto Adachi, Takasago (JP); Kazuto Okada, Kobe (JP); Hirohiko Fukumoto, Kobe (JP); Kenichi Inoue, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 362 days.

(21) Appl. No.: 09/902,697

(22) Filed: Jul. 12, 2001

(65) Prior Publication Data

US 2002/0015746 A1 Feb. 7, 2002

(30) Foreign Application Priority Data

Jul. 31, 2000 (JP) ........................................ 2000-231658

(51) Int. Cl.[7] ................................................ H05B 6/10
(52) U.S. Cl. ........................... 219/635; 425/50; 425/40
(58) Field of Search ................................. 219/635, 642, 219/670, 671; 425/50, 17, 40, 35, 33, 317, 174.8 R; 156/113; 264/403

(56) References Cited

U.S. PATENT DOCUMENTS

| 1,379,595 | A | | 5/1921 | Post |
| 1,566,500 | A | | 12/1925 | Northrup |
| 2,451,992 | A | | 10/1948 | Grotenhuis |
| 3,294,606 | A | | 12/1966 | Morgan et al. |
| 5,630,958 | A | | 5/1997 | Stewart, Jr. et al. |
| 6,551,085 | B1 | * | 4/2003 | Mitamura et al. ............ 425/35 |
| 6,655,940 | B2 | * | 12/2003 | Mitamura et al. ............ 425/40 |

FOREIGN PATENT DOCUMENTS

| DE | 34 15 967 | 11/1984 |
| DE | 39 11 082 | 10/1990 |
| EP | 1 090 729 | 4/2001 |
| GB | 2 200 085 | 7/1988 |
| JP | 7-96525 | 4/1995 |
| JP | 2000-61963 | 2/2000 |
| WO | WO 99/03308 | 1/1999 |
| WO | WO 00/13883 | 3/2000 |

OTHER PUBLICATIONS

Derwent Publications, XP–002239577, JP 2000–61963, Feb. 29, 2000.

* cited by examiner

*Primary Examiner*—Quang T. Van
(74) *Attorney, Agent, or Firm*—Oblon, Spivak, McClelland, Maier & Neustadt, P.C.

(57) ABSTRACT

An apparatus for effectively heating a green tire generates heat to a metal member embedded therein using electromagnetic induction, to complete a heating formation of a green tire in a sufficiently short time. Particularly, in the thick portion of the green tire which is hard to heat, the efficiency of heat generation due to electromagnetic induction is increased by effectively concentrating a high frequency magnetic field on the metal member embedded therein. The apparatus for heating a green tire comprises a local heating coil for forming high frequency magnetic field along a portion of extending direction of a metal member, a high frequency power supply for supplying high frequency power to the local heating coil, and a mechanism for moving the local heating coil relatively in the extending direction of the metal member.

13 Claims, 25 Drawing Sheets

Fig. 16(a)
Fig. 16(b)
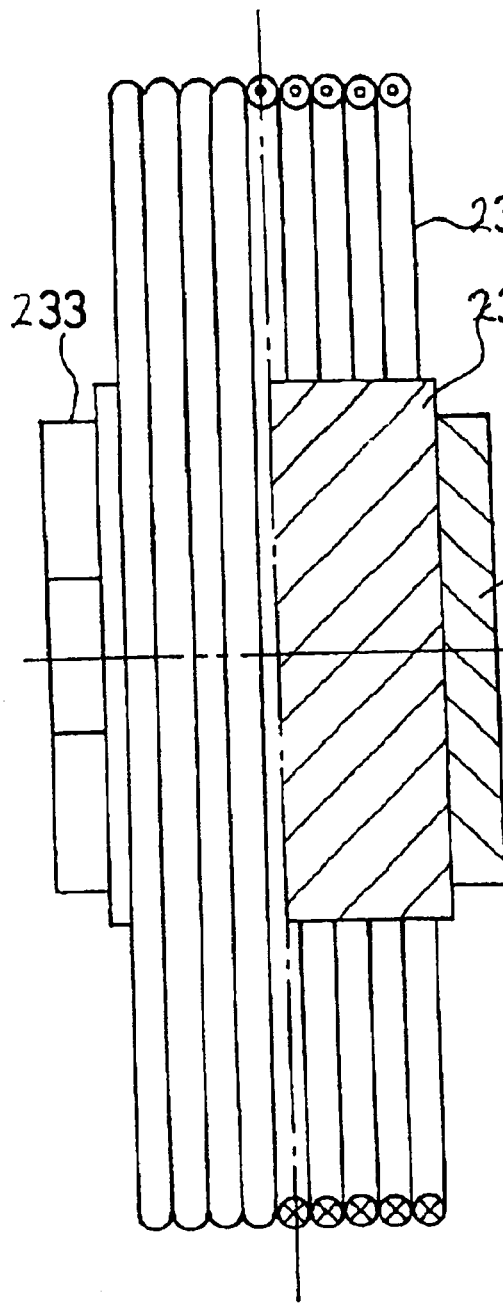
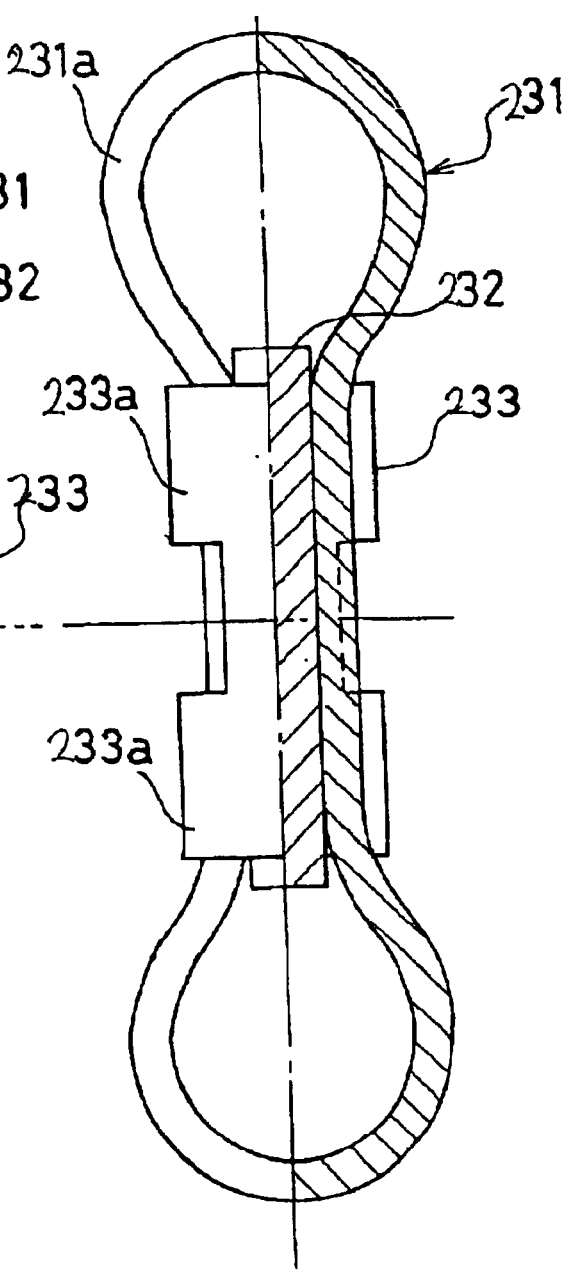

SECTION A-A

APPARATUS FOR HEATING A GREEN TIRE

BACKGROUND OF THE INVENTION

1. Field of the Invention

The present invention relates to an apparatus for heating a green tire during vulcanizing process or the preceding process thereof.

2. Description of the Related Art

Conventionally, a green tire formed by a forming machine is kept in a rack of keeping place set inside a building of a vulcanizing facilities and the like under room temperature conditions, and is taken from the rack to convey to a vulcanizing machine based on a production plan. If the green tire is carried in the vulcanizing machine, for example in a bladder type vulcanizing machine, the green tire is loaded into a mold by clamping the mold, and then a heat medium under high temperature and high pressure is supplied in a bladder inserted into a tire hole, so that the bladder is extended to be close to an inner wall surface of the tire. And, by heating the inner wall surface of the tire while pressurizing it in a mold direction via the bladder, a tire groove of the mole is formed in a tread portion of the green tire. Also, by heating the green tire from the inside and the outside using the heated mold and the bladder contacting to the heat medium of high temperature, to rise temperature of the green tire up to a vulcanizing initiation temperature (at least 100~120° C.) early, it is possible to complete a vulcanizing process in a short time.

However, as above-described prior art, if the green tire is kept for a long time under room temperature conditions, then the green tire becomes the temperature near room temperature, for example 25° C., therefore it is necessary to rise the temperature of the green tire from room temperature to initial temperature of vulcanizing when vulcanizing formation the green tire in the vulcanizing machine. In the prior art, as described above, although the vulcanizing process is completed in a short time by heating the green tire from the inside and the outside using the mold and the bladder, but the green tire has a rubber of which heat transfer ratio is low as a main component, therefore though temperature of a surface of the green tire is raised in a short time, the temperature rising of inner center particularly in a large thickness portion of the tread having large thickness and bead portion is remarkably delayed. Accordingly, vulcanizing process must be continued until temperature of the inside of the green tire is raised to complete the vulcanization, even when vulcanization of the surface side of the green tire is completed, therefore there is a problem that the vulcanizing process could not completed in a sufficiently short time.

Also, a method of irradiating a micro wave to a green tire when the green tire is kept, for preheating the green tire before vulcanizing process is adopted. But in this method, the macro wave preheats (heat) mainly the surface side of the green tire and the inside in which the temperature rising is most delayed upon vulcanization, can not be preheated sufficiently, therefore it is not a fundamental solution for completing vulcanizing process in a short time.

Furthermore, such problems are caused in a various type of a vulcanizing machine such a bladder type, a bladder-less type etc., and particularly in the bladder type vulcanizing machine, the problems become more serious since the bladder itself is formed of rubber having low heat conduction ratio.

Also, as disclosed in Japanese Patent Laid-Open No. Hei 7-96525, there is known a technique that a green tire comprising a bead and belt layer of conductive material is heated from the inside, by generating a magnetic field in the portion of the bead and belt layer to induce over-current due to electromagnetic induction thereby generating heat. However, the study has not been made for how to constitute an apparatus for efficiently heating when adopting the heating method to the vulcanization of green tire.

SUMMARY OF THE INVENTION

Therefore, the object of the present invention is to provide an apparatus for effectively heating a green tire using a heating method by means of electromagnetic induction, thereby completing a heating formation of a green tire in a sufficiently short time.

To solve the above problem, according to one aspect of the present invention, there is provided an apparatus for heating a green tire by generating heat to a metal member embedded in the green tire using electromagnetic induction, comprising: a local heating coil for forming high frequency magnetic field along a portion of an extending direction of said metal member; a high frequency power supply for supplying high frequency power to said local heating coil; and moving means for moving said local heating coil relatively in the extending direction of said metal member.

With above construction, since the local heating coil forms high frequency magnetic field along a portion of extending direction of said metal member, heat generation effect on the portion of the metal member is increased. At this time, it is possible to heat the whole metal member efficiently, by relatively moving the local heating coil and said metal member.

Here, said local heating coil can form high frequency magnetic field along a portion of facial direction of a ring-belt-shaped metal member embedded in a tread portion of said green tire, or can form high frequency magnetic field along a portion of peripheral direction of a wire-ring-shaped metal member embedded in a tread portion of said green tire.

Also, said local heating coil can comprise a center core, a side core and a coil, and at least one of said center core, said core and said coil can have a deformed portion, and said deformed portion may be formed so as to concentrate high frequency magnetic field to said tread portion or a shoulder portion continued from said tread portion.

In some cases, the shoulder portion is positioned at the both ends of the ring-belt-shaped metal member and curved in a width direction, or thickness of the shoulder portion is thicker than that of the tread portion. In such cases, heating to the shoulder portion becomes more necessary. According to the above construction, the deformed portion thereof concentrates magnetic flux on the both ends of a width direction of the ring-belt-shaped metal member positioned at the shoulder portion, so that it is possible to increase heat generation efficiency at these portions.

Said center core can be formed as a curved surface or stepped shape so as to follow the periphery of said green tire.

With above construction, since the center core is formed as a curved surface or stepped shape corresponding to R shape of peripheral direction of the green tire, the magnetic flux is easily formed along the peripheral direction of the ring-belt-shaped metal member and heat generation efficiency of the ring-belt-shaped metal member can be improved.

Said local heating coil can be installed apart in a width direction of said tread portion and can be constructed to have installation interval variable in response to the green tire size.

With above construction, the magnetic flux can be formed in the whole width direction, by adjusting the installation interval of said local heating coil in response to size of width direction of the ring-belt-shaped metal member.

Said local heating coil can be constructed to comprise a spiral coil and a core arranged on a side of said spiral coil.

With above construction, high frequency magnetic field is formed along peripheral direction of the wire-ring-shaped metal member, so that the wire-ring-shaped metal member is heated efficiently.

Said spiral coil can have an approximately elliptical shape following said wire-ring-shaped metal member and said core may have a square shape following said wire-ring-shaped metal member.

With above construction, the spiral coil having an approximately elliptical shape forms magnetic field efficiently following the wire-ring-shaped metal member.

Said moving means can be a rotational driving mechanism for rotating said green tire about a center axis thereof.

With above construction, it is possible to realize uniform heating of the whole metal member more efficiently.

Furthermore, said local heating coil can be placed between a pair of green tires so that it can heat said pair of green tire simultaneously.

Said local heating coil can be provided so as to heat one green tire, and a ferrite core can be disposed opposite to said green tire with respect to said local heating coil.

With above construction, magnetic flux opposite to the green tire is converged so that heating efficiency can be increased.

The apparatus can further comprise an auxiliary core, and said auxiliary core can be disposed so as to raise the density of high frequency magnetic field of said shoulder portion.

With above construction, magnetic flux is concentrated on both ends of width direction of the ring-belt-shaped metal member positioned at the shoulder portion, so that heating efficiency at this portion can be increased.

According to other aspect of the present invention, there is provided, an apparatus for heating a green tire by generating heat to a metal member embedded in the green tire using electromagnetic induction, comprising: a heating coil for forming high frequency magnetic field along a portion of an extending direction of said metal member, said heating coil being constructed to be insertable through a tire hole of said green tire; and a high frequency power supply for supplying high frequency power to said heating coil, wherein said heating coil is disposed so that both ends thereof are positioned in the vicinity of both bead portions of said green tire.

With above construction, high frequency magnetic field produced from a columnar heating coil inserted through the tire hole induction-heats a metal member of the tread portion and a metal member of the bead portion, so that it is possible to sufficiently perform preheating particularly, of the tire inside of tread portion and bead portion having large thickness where temperature rising is delayed. Additionally, since the metal member of the tread portion and bead portion can be induction-heated using only one columnar heating coil, it is possible to save the cost of components and cost for assembling.

According to another aspect of the present invention, there is provided, an apparatus for heating a green tire by generating heat to a metal member embedded in the green tire using electromagnetic induction, comprising: a heating coil for forming high frequency magnetic field along a portion of an extending direction of said metal member; a high frequency power supply for supplying high frequency power to said heating coil, and a magnetic material member for inducing high frequency magnetic field formed by said heating coil to said metal member.

With above construction, since high frequency magnetic field to be produced by the heating coil passes through the metal member and is formed to converge onto the magnetic material, magnetic flux density passing through the metal member becomes large and the metal member can be induction-heated efficiently.

According to another aspect of the present invention, there is provided, an apparatus for heating a green tire by generating heat to a metal member embedded in the green tire using electromagnetic induction, comprising: a heating coil for forming high frequency magnetic field along a portion of an extending direction of said metal member; a high frequency power supply for supplying high frequency power to said heating coil, and frequency changing means for changing the frequency of power to be supplied by said high frequency power supply.

The structure of the metal member embedded in the inside of tire is different according to type or size of the tire. With above construction, since the frequency can be changed suitably in response to wire diameter or current permeate depth thereof, it is possible to heat the metal member by induction efficiently.

Here, the apparatus can further comprise a condenser for causing a resonance current to said heating coil.

With above construction, since the resonance current is formed by means of the condenser, heat generation efficiency of the whole apparatus can be improved, and it is possible to improve the power-factor and to heat the metal member by induction efficiently.

Moreover, the apparatus can further comprises a voltage detector for detecting voltage applied to both ends of said condenser, and said frequency changing means may control the frequency of power to be supplied by said high frequency power supply on the basis of voltage value detected by said voltage detector.

According to another aspect of the present invention, there is provided, an apparatus for heating a green tire by generating heat to a metal member embedded in the green tire using electromagnetic induction, comprising: a heating coil for forming high frequency magnetic field along a portion of an extending direction of said metal member; a high frequency power supply for supplying high frequency power to said heating coil, and relative distance adjusting means which is capable of adjusting the distance between said heating coil and said metal member.

With above construction, since the magnetic flux density passing through the metal member can be adjusted in response to material constitution or shape of the metal member, it is possible to heat the metal member by induction efficiently.

It is preferred that the apparatus for heating a green tire according to the present invention is used as preheating apparatus for performing the preheating before the green tire enters into a green tire vulcanizing apparatus.

With this invention, a large thickness portion which is difficult to rise temperature is preliminarily temperature-raised to some degree, so that it is effective to complete a later vulcanizing process in a more short time.

BRIEF DESCRIPTION OF THE DRAWINGS

The above objects, other objects, features and advantages of the present invention will be better understood from the following description taken in conjunction with the accompanying drawings, in which:

FIG. 16 shows a first coil means, which forms a high frequency magnetic field to a ring-belt-shaped metal member in a facial direction;

DETAILED DESCRIPTION OF THE PREFERRED EMBODIMENTS

Now, the embodiment of the present invention will be explained with reference to FIGS. 1 to 28.

Figure 2:
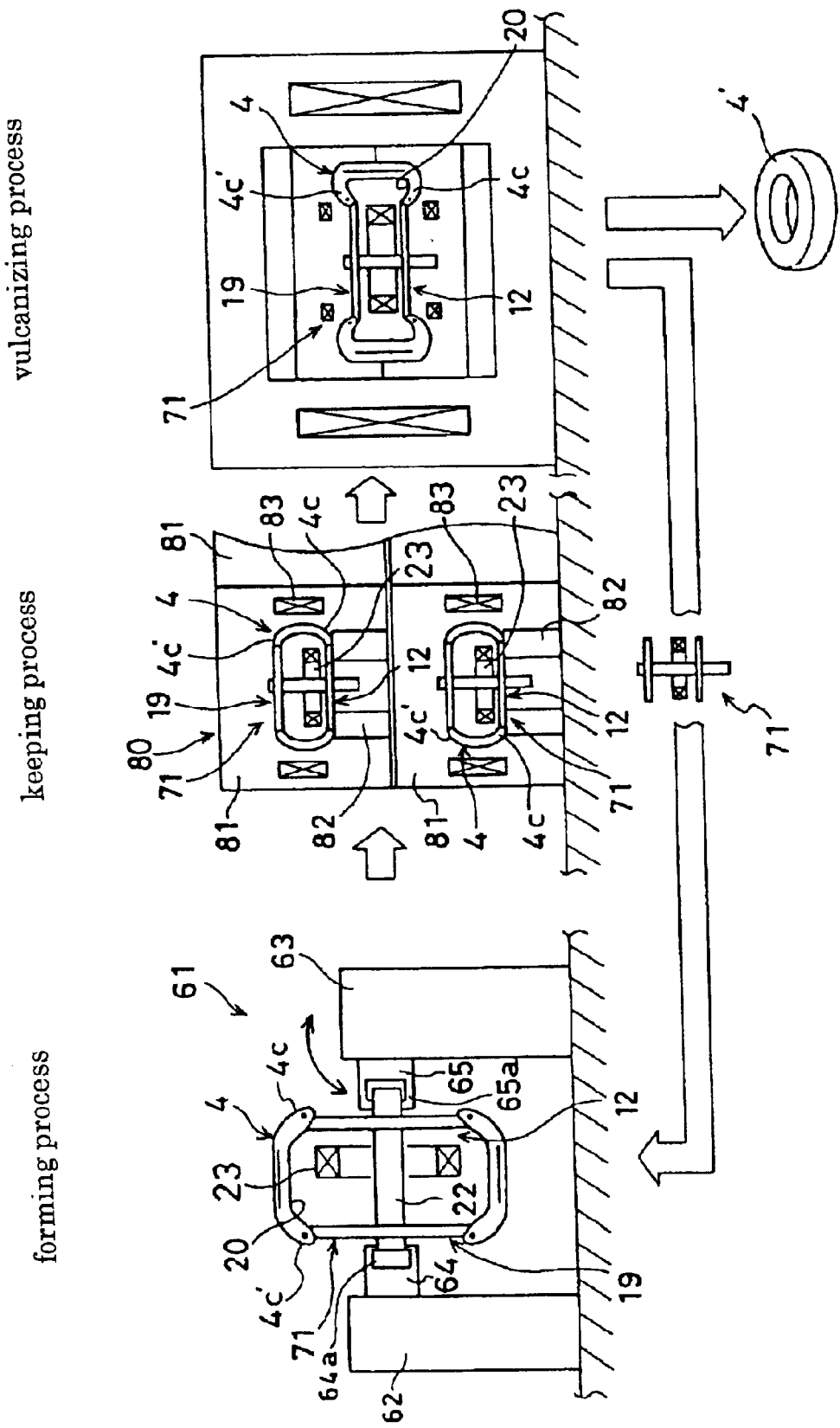
FIG. 2 is a diagrammatic view showing a manufacturing process of a tire according to one embodiment of the invention.

As shown in FIG. 2, a green tire preheating apparatus according to the present embodiment is provided in a keeping process. The keeping process is disposed between a forming process for forming a green tire 4 and a vulcanizing process for vulcanizing the green tire 4, and temporarily keeps the green tire 4 before vulcanizing process on the basis of production plan. Also, operation of the green tire preheating apparatus and method of preheating the green tire by the apparatus in the keeping process will be explained later.

Figure 3:
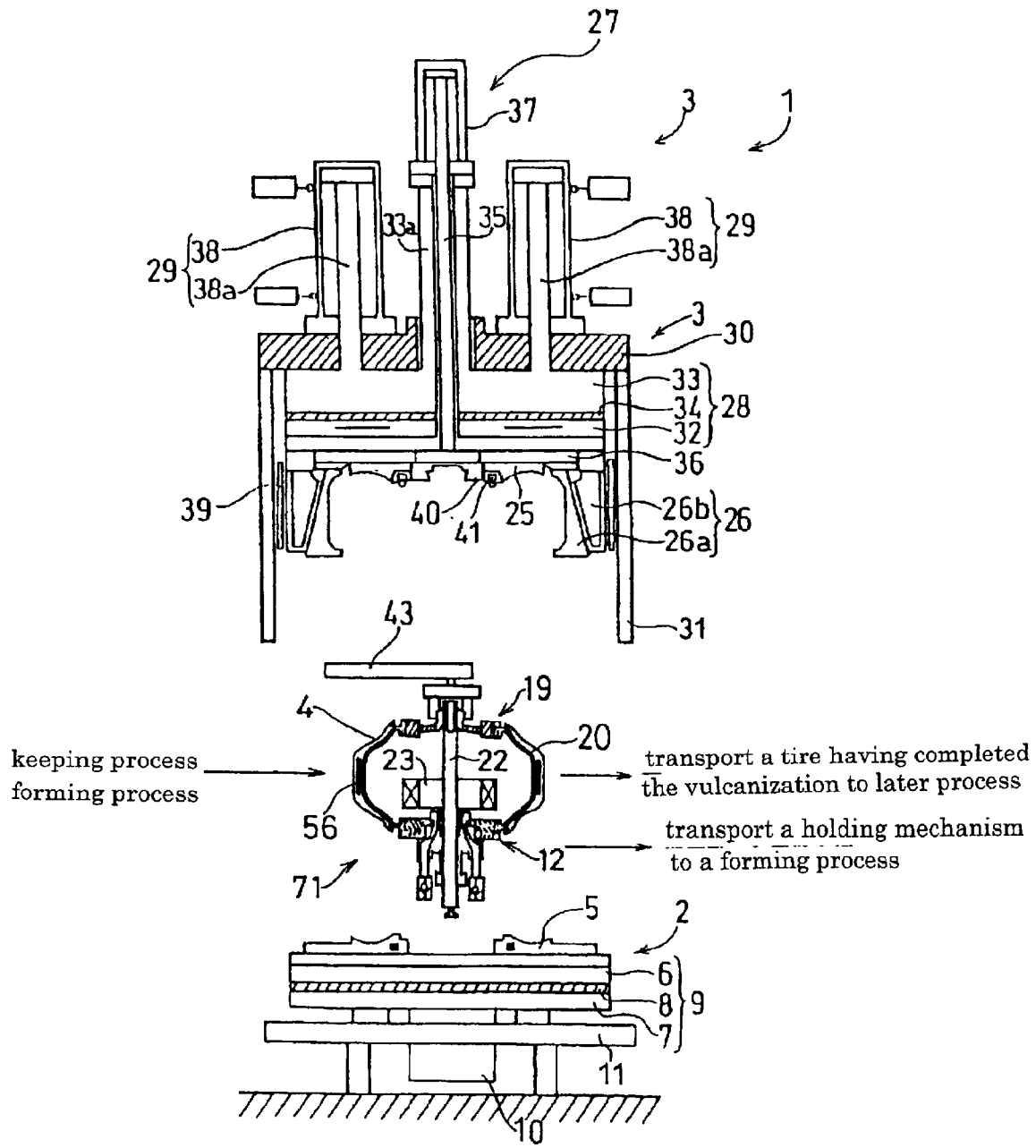
FIG. 3 is a cross sectional view schematically showing a side of a vulcanizing machine in a vulcanizing process according to one embodiment of the invention upon carrying in a green tire.
Figure 7:
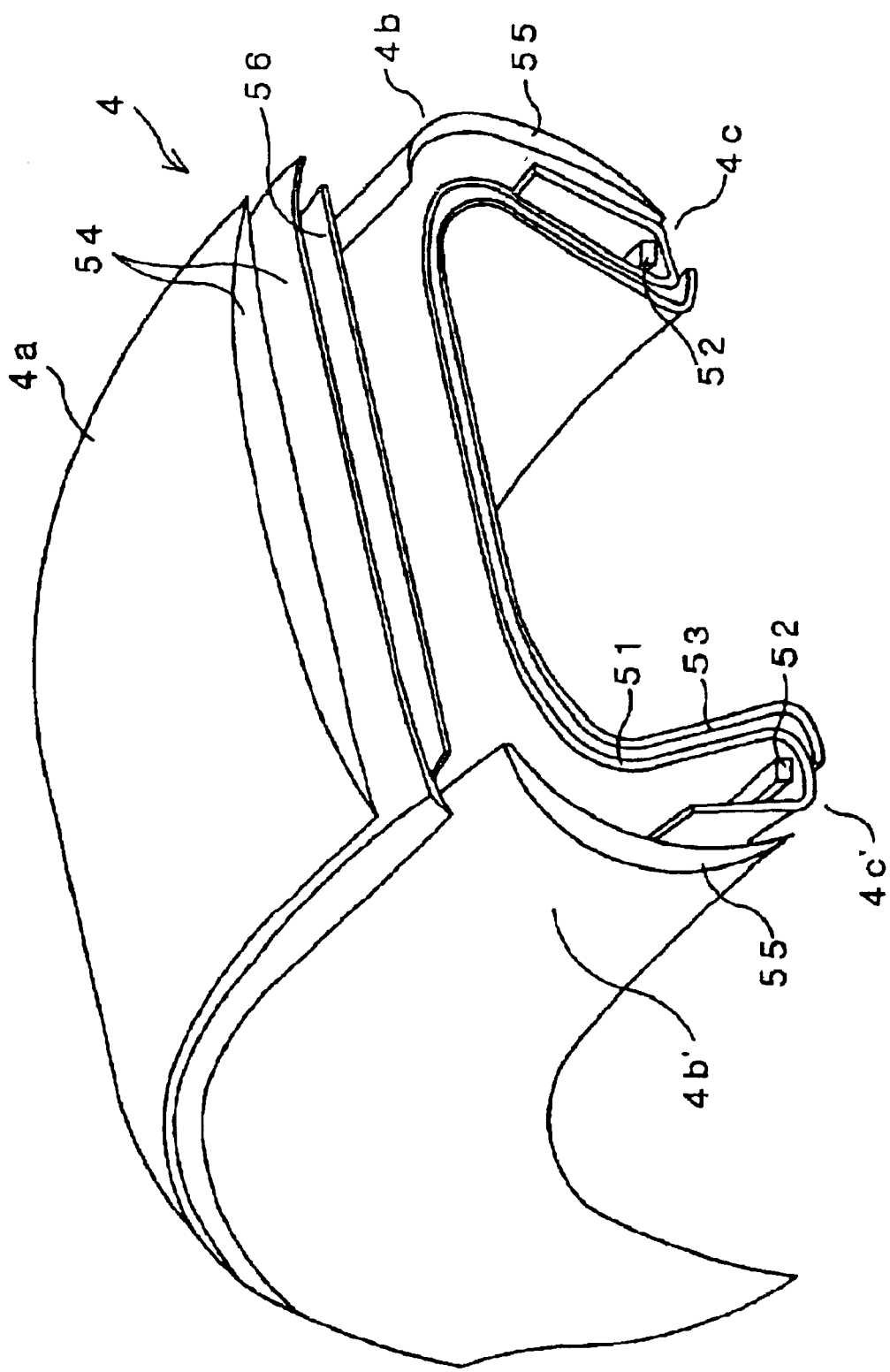
FIG. 7 is an exploded perspective view showing essential parts of the green tire.

The vulcanizing process in which the green tire 4 is supplied from the keeping process is provided with a vulcanizing machine for vulcanizing the green tire 4. As shown in FIG. 3, the vulcanizing machine 1 has a mold-fixing unit 2 set in a predetermined height position, and mold-lifting unit 3 which moves up and down with respective to the mold-fixing unit 2. Also, as shown in FIG. 7, the green tire 4 has a carcass assembly 51 bent at both ends thereof, a metal bead wire 52 provided in the bent portion of the carcass assembly 51, a rubber inner linear 53 bonded to an inner peripheral surface of the carcass assembly 51, a rubber tread member 54 and a side wall member 55 respectively bonded to an outer peripheral surface and a side peripheral surface of the carcass assembly 51, and a metal belt member 56 provided between the tread member 54 and the carcass assembly 51, so that structure has the metal members(the bead wire 52, the belt member 56) inside the tire, that is in the tread portion 4a and bead portions 4c, 4c' having large thickness.

As shown in FIG. 3, the mold-lifting unit 3 has an upper side mold 25 to be contacted with an upper side wall 4b' of the green tire 4, a split mold 26 positioned in the peripheral direction of the tread portion 4a of the green tire 4, a first mold lifting means 27 for moving the upper side mold 25 and a slide segment 26a of the split mold 26 up and down, an upper heating mechanism 28 for heating the upper side mold 25 to a predetermined temperature, a second mold lifting means 29 for moving the upper heating mechanism 28 and a stationary ring 26b of the split mold 26 up and down, and supporting member 30 for supporting these mechanisms 27~29.

The upper heating mechanism 28 has a disc-shaped upper platen 32. The upper platen 32 has an inner space to which high temperature vapor is supplied, and is generated a heat by vapor supplied to the inner space to heat the upper side mold 25 facially. Also, the upper heating mechanism 28 has a platen support 33 for supporting the upper platen 32, and an insulating plate 34 interposed between the upper platen 32 and the platen support 33 so as not to transfer heat of the upper platen 32 to the platen support 33.

Figure 4:
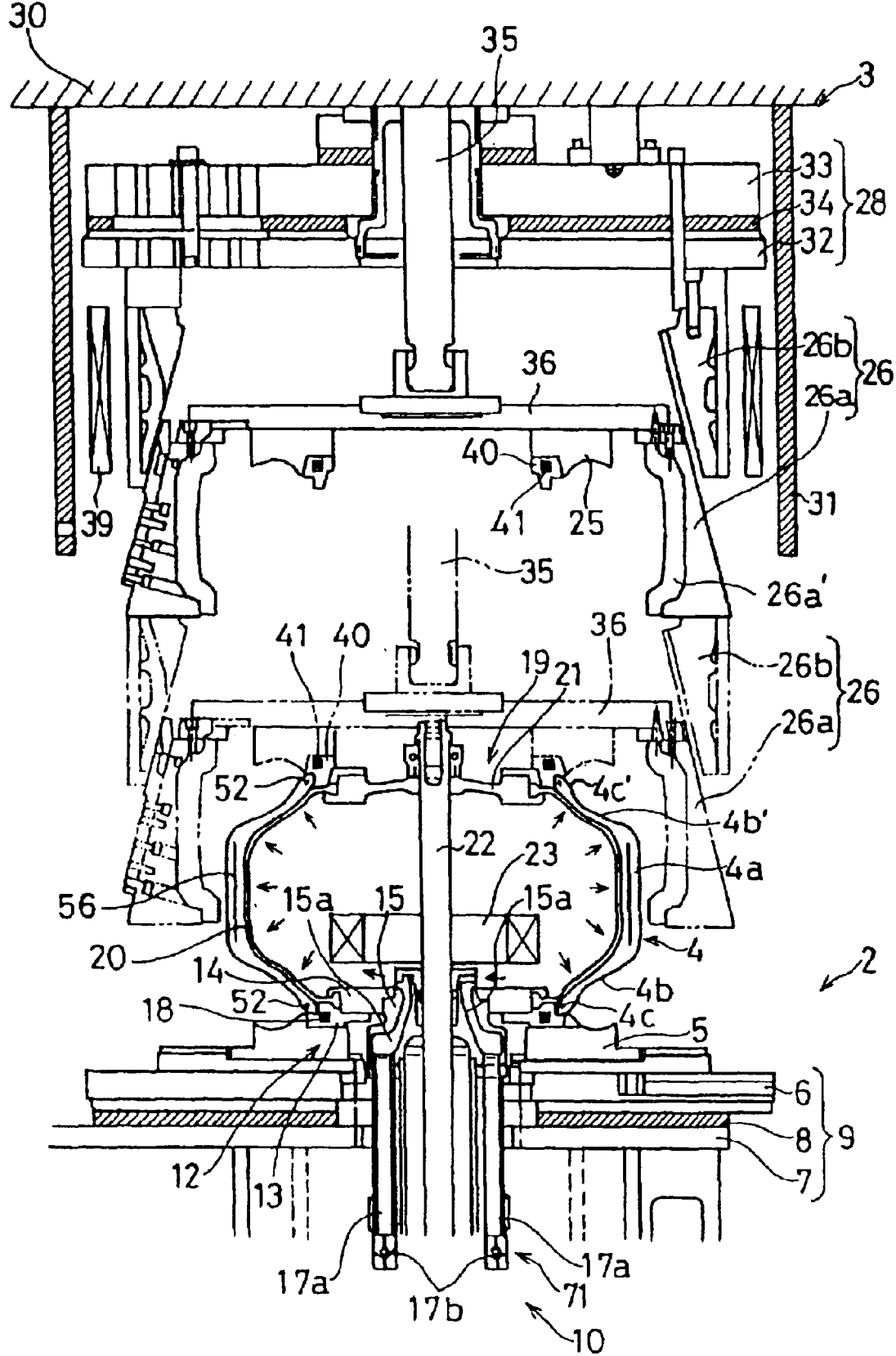
FIG. 4 is a cross sectional view schematically showing a side of a vulcanizing machine in the keeping process according to one embodiment of the invention upon clamping a green tire mold.
Figure 6:
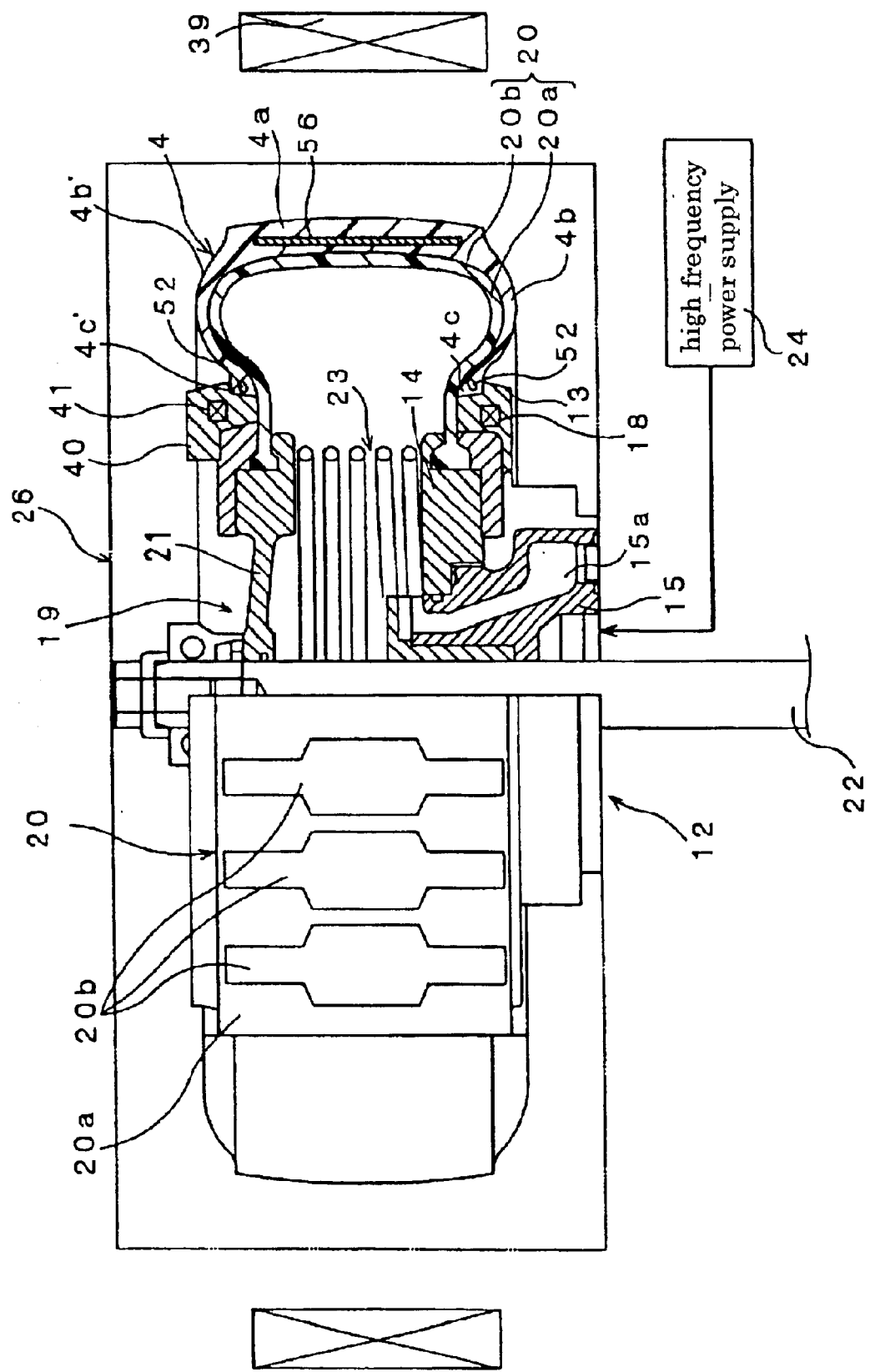
FIG. 6 is a cross sectional view schematically showing a tire mold and a green tire during vulcanization.

Also, a rod-shaped member 35 of the first mold lifting means 27 is inserted through the center portion of the upper heating mechanism 28 so as to be movable up and down. As shown in FIG. 4, a disc-shaped slide plate 36 is provided at a lower end of the rod-shaped member 35. In the lower surface of center portion of the slide plate 36, the upper side mold 25 is fixed at a center side. An upper bead ring 40 formed so as to abut to the upper bead portion 4c' of the green tire 4 is provided at an inner periphery of the upper side mold 25. An annular third induction-heating coil 41 is provided inside the upper bead ring 40. And, a high frequency power supply 24 of FIG. 6 is connected to the third induction-heating coil 41, and the third induction-heating coil 41 applies an intensive high frequency magnetic field to the upper bead portion 4c' of the green tire 4 by means of supply of high frequency power, to firstly heat a bead wire 52 of the upper bead portion 4c' by induction.

The slide segment 26a having a plurality of segment molds 26a' formed of non-magnetic materials such as aluminum and the like is provided in a lower surface of outer periphery of the slide plate 36. Each slide segment 26a is disposed on the same circumference about the upper side mold 25 at equal intervals and is engaged to be movable centrally. In an outer direction of these slide segments 26a, the stationary ring 26b formed of non-magnetic materials is disposed. The stationary ring 26b is fixed to a lower surface peripheral edge of the upper platen 32 and is adapted to move the slide segment 26a forward and backward radially while engaging to an outer surface of the slide segment 26a. And, the slide segment 26a forms a tubular mold corresponding to the tread portion 4a of the green tire 4 when it has moved centrally by the stationary ring 26b.

The mold-fixing unit 2 is disposed at the lower side of the mold-lifting unit 3. The mold-fixing unit 2 has a lower side mold 5 to be contacted with an lower side wall 4b of the green tire 4, a lower heating mechanism 9 for heating the lower side mold 5 to a predetermined temperature, a center mechanism 10 provided at a center portion of the lower heating mechanism 9 and the lower side mold 5, and a base frame 11 for supporting the center mechanism 10 and the lower heating mechanism 9.

The lower heating mechanism 9 has a disc-shaped lower platen 6 for supporting the lower side mold 6 facially. The lower platen 6 has an inner space to which high temperature vapor is supplied, and is generated a heat by vapor supplied to the inner space to heat the lower side mold 5 facially. Also, the lower heating mechanism 9 has a platen support 7 for supporting the lower platen 6, and an insulating plate 8 interposed between the lower platen 6 and the platen support 7 so as not to transfer heat of the lower platen 6 to the platen support 7. And, in the center portion of the lower heating mechanism 9 constructed as such, the center mechanism 10 is provided, and the center mechanism 10 is provided with a holding mechanism 71 as a main part.

Figure 1:
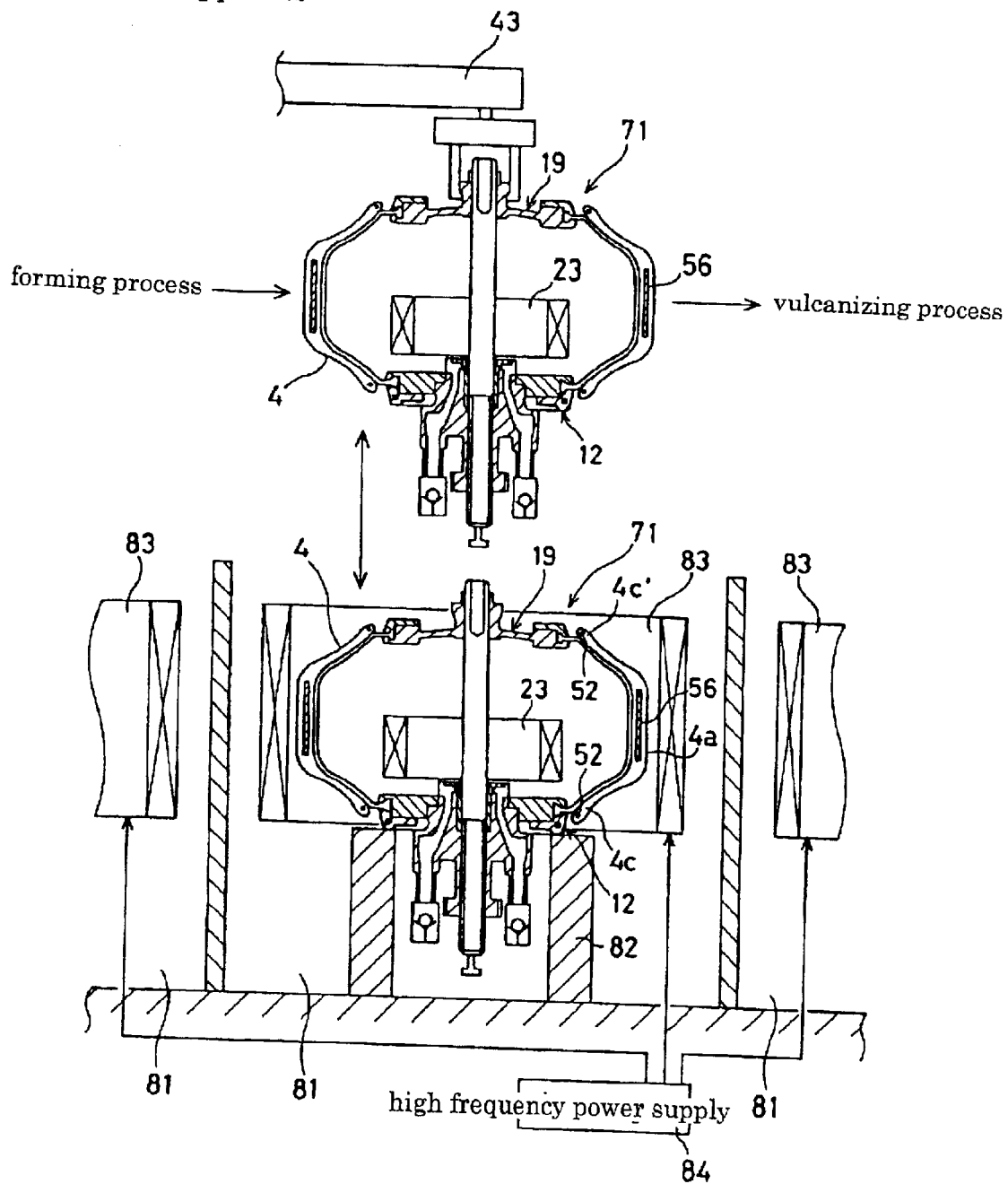
FIG. 1 is a cross sectional view schematically showing a side of a vulcanizing machine in a keeping process according to one embodiment of the invention.

The holding mechanism 71 can be attached to and detached from the mold-fixing unit 2 (the lower heating mechanism 9 and the lower side mold 5), and as shown in FIGS. 1 and 3, has a bladder 20, a lower ring mechanism 12 holding a lower edge of the bladder 20, an upper ring 19 holding an upper edge of the bladder 20, and a center post 22 passing through a center portion of the lower ring mechanism 12 and the upper ring 19 and capable of coupling both rings 12, 19 to be fixed, with a connection and positional relationships as described below.

Namely, as shown in FIG. 4, the lower ring mechanism 12 has a lower bead ring 13 formed so as to be abutted to the lower bead portion 4c of the green tire 4, a lower bladder ring 14 provided on a top surface of the lower bead ring 13 and supporting a lower edge of the bladder 20 by cooperating with the lower bead ring 13 therebetween, a clamp ring hub 15 provided at an inner peripheral side of the lower bladder ring 14. Inside the clamp ring hub 15, distributing channels 15a, 15a for flowing a pressurized heating medium such as vapor, nitrogen gas, etc. are formed. And, these distributing channels 15a, 15a are communicated from an upper end surface to a lower end surface of the clamp ring hub 15, and the distributing channels 15a, 15a at the lower end are connected to a pressurized heating medium supplying apparatus (not shown) via lines 17a, 17a and switching valves 17b, 17b.

Also, inside the lower bead ring 13, an annular first induction-heating coil 18 is provided. A high frequency power supply 24 of FIG. 6 for supplying high frequency power is connected to the first induction-heating coil 18 to be disconnectable. And, the first induction-heating coil 18 applies an intensive high frequency magnetic field to the lower bead portion 4c of the green tire 4 by means of supply of high frequency power, to firstly heat a bead wire 52 of the lower bead portion 4c by induction.

In the center portion of the lower ring mechanism 12, the center post 22 is erectly provided so as to be slidable vertically. An upper ring 19 is provided at an upper end of the center post 22. The upper ring 19 has an upper bladder ring 21, and the upper bladder ring 21 supports an upper edge of the bladder 20. Meanwhile, a post lifting mechanism (not shown) for moving the center post 22 up and down to optional height position is coupled to a lower end of the center post 22 to be disconnectable, and the post lifting mechanism 22 constitutes the center mechanism 10 together with the holding mechanism 71. And, the post lifting mechanism elevates the upper edge of the bladder 20 to raise the center post 22 up to upper limit position so that the bladder 20 is set to diameter smaller than that of hole of the green tire 4 when carrying out the tire having completed the vulcanization, while the post lifting mechanism lowers the center post 22 so that the bladder 20 is enlarged to a diameter capable of contacting to an inner wall surface of the green tire 4.

The bladder 20 to be contracted and enlarged by the center post 22 presses the tire inner wall surface in a mold direction by supplying the pressurized medium when vulcanizing the green tire 4, and has a low elongation material which is hard to deteriorate under high temperature condition as a constituent member. The low elongation material is formed to a shape similar to a shape of the tire inner wall surface having finished the vulcanization by vulcanizing the green tire 4. Namely, as shown in FIG. 6, the bladder 20 adopts the low elongation material which is hard to deteriorate under high temperature condition, and has a bladder body 20a formed by shaping the material similar to shape of the tire inner wall surface of the tire having finished the vulcanization, and a plurality of magnetic member 20b provided on the surface of the bladder body 20a with equal intervals. The magnetic member 20b comprises metallic thin film having magnetism such as mesh metal, metallic deposition film, etc., and is formed such that a portion corresponding to the tread portion 4a of the green tire 4 becomes larger area than the other portions.

The low elongation material is a material having properties of elongation smaller than that of convention bladder rubber (for example butyl rubber) under high temperature condition at the vulcanizing temperature and the particularly preferred material is that has an elongation in the range of 5%~15% under high temperature condition of 200° C. The reason why the elongation in the above range is preferred is that if the elongation is less than 5%, the power for pressing uniformly the whole green tire 4 is reduced so that the plasticity becomes insufficient upon vulcanization, and if the elongation exceeds 15%, it is difficult to vulcanize the green tire 4 precisely as conventional bladder rubber (for example butyl rubber).

As the low elongation material which is hard to deteriorate under high temperature condition, knitted fabric or woven fabric using fabric such as polyester, nylon, aramid, polyparaphenylenebenzobisoxazole (PBO), or mesh metal or high precise fabric, carbon-containing fabric, metal coated fabric, resin coated fabric can be adopted, and material formed by mixing at least one type among above materials can be adopted. As a form of mixture, there is form of laminate structure formed by laminating mesh metal on a polyester film or depositing metal film on a polyester film, or form woven while uniformly of locally distributing metal coated fabric and high precise fabric. Also, in order to have air tightness, there is a form impregnated or coated with at least one of fluorine, resin such as silicon, and elastomer into or onto a substrate such as the above-mentioned knitted fabric or woven fabric. And, these forms are suitably selected in accordance with design specification of bladder (existence of heat generation by induction heating or intensity, etc.).

Inside the bladder 20, a second induction-heating coil 23 is disposed. The second induction-heating coil 23 is provided around the center post 22, and is set to a coil height smaller than the distance in the case where the upper bladder ring 21 and the lower bladder ring 13 are most approached, and set to a coil diameter smaller than the outer diameter of both rings 21, 14 so as not to be contacted to the contracted bladder 20. Also, the second induction-heating coil 23 is disposed so as not to be contacted to both rings 21, 14 even in the case where the upper bladder ring 21 was lowered to a lower limit position. And, a high frequency power supply 24 is connected to the second induction-heating coil 23 to be disconnectable, and the second induction-heating coil 23 applies intensive high frequency magnetic field to the bladder 20 by supply of high frequency power, thereby heating the magnetic member 20b of the bladder 20 by induction firstly.

As shown in FIG. 2, the holding mechanism 71 is adapted to transport between vulcanizing process, keeping process and forming process by a transporting apparatus 43 in FIG. 1. And, the holding mechanism 71 functions as a forming drum in the forming process, and functions to prevent deformation of the green tire 4 and to prevent displacement of the supporting center in keeping process or in transporting between processes, and functions as a main part of the above mentioned center mechanism 10 in vulcanizing process.

A tire-forming machine 61 of a single stage type is provided in the forming process. Also, the tire-forming machine 61 may be two-stage type. As shown FIG. 2, the tire-forming machine 61 has a first driving apparatus 62 and a second driving apparatus 63. The first driving apparatus 61 and the second driving apparatus 62 are provided with a first chuck mechanism 64 and a second chuck mechanism 65, respectively. These chuck mechanisms 64, 65 have chuck members 64a, 65a each capable of holding the center portions of the upper ring 19 and the lower ring mechanism 12 of the holding mechanism 71. And, both chuck mechanisms 64, 65 are oppositely disposed such that the rotating shaft exist on the same straight line, and are linked so as to rotate with same rotational speed and to stop at a same rotational angle. Moreover, the first chuck mechanism 64 on one side is adapted to forward and backward in a rotating axis direction, and enlarges and contracts the ring distance between the upper ring 19 and the lower ring mechanism 12 of the holding mechanism 71 when forming and taking out the green tire 4. Also, the tire forming mechanism 61 has a pressure gas supplying apparatus (not shown) for supplying pressure gas into the bladder 20 when taking out the green tire 4, etc.

As shown in FIG. 2, the row tire 4 prepared in the forming process is transported in the state held to the holding mechanism 71, and conveyed to later keeping process or vulcanizing process. The keeping process has a keeping depot 80. The keeping depot 80 has a plurality of keeping portion 81 keeping the green tire 4 while holding it with the holding mechanism 71. Each keeping portion 81 is provided with a green tire preheating apparatus as shown in FIG. 1. The green tire preheating apparatus has a cylindrical loading table 82 formed to be contacted to a lower surface of the lower ring mechanism 12, a preheating induction-heating coil 83 provided to surround the green tire 4 on the loading table 82, and a high frequency power supply 84 for supplying high frequency power with respect to the preheating induction coil 83. And, the preheating coil 83 applies an intensive high frequency magnetic field to the tread portion 4a of the green tire 4 by supplying high frequency power from the high frequency power supply 84, thereby heating the belt member 56 of the tread portion 4a by induction firstly.

In the above construction, a green tire preheating method will be explained through the operation of the green tire preheating apparatus.

Firstly, as shown in FIG. 2, in the forming process, if the green tire 4 which comprises a plural layers having the belt 56 and bead wire 52 in the inside thereof by the tire forming machine 61, then the upper ring 19 and the lower ring mechanism 12 of the holding mechanism 71 are coupled to be fixed by the center post 22, and the first chuck mechanism 64 is disengaged from the upper ring 19. And, after grasping the center portion of the upper ring 19 by the transporting apparatus 43 of FIG. 1, the chuck mechanism 65 is disengaged from the lower ring 12, and the holding mechanism 71 is pulled out upwardly, thereby removing the holding mechanism 71 together with the green tire 4 from the tire forming machine 61. And, in the case where there exists a standby time until vulcanizing the green tire 4, the green tire 4 is transported to the green tire preheating apparatus in the keeping process while holding the green tire 4 with expanded state by the holding mechanism 71, and the green tire 4 is kept while preheating it by the operation described below.

Namely, as shown in FIG. 1, the holding mechanism 71 holding the green tire 4 is positioned above the loading table 82 in the green tire preheating apparatus. And, the holding mechanism 71 is lowered to be loaded on the loading table 82, thereby keeping the green tire 4 together with the holding mechanism 71. Thereafter, by supplying high frequency power to the preheating coil 83 from the high frequency power supply 84, the intensive high frequency magnetic field is applied to the tread portion 4a of the green tire 4 to heat the belt member 56 of the tread portion 4a by induction. Furthermore, high frequency magnetic field produced by the preheating coil 83 heats also the bead wire 52 of the bead portions 4c, 4c' by induction. Thereby, even though the green tire 4 is kept under room temperature condition, since the tread portion 4a and the bead portions 4c, 4c' of the green tire 4 having large thickness are heated from the inside of tire by the green tire preheating apparatus, temperature of the green tire 4 is not lowered and is raised up to the temperature near the vulcanizing temperature according to the degree of high frequency magnetic field application.

Next, in case of vulcanizing the green tire 4, the green tire 4 is transported to the vulcanizing process while holding it by the holding mechanism 71, and the green tire is vulcanized by operations described below. Namely, as shown in FIG. 3, by raising the mold-lifting unit 3 firstly, the mold-lifting unit 3 is positioned above the mold-fixing unit 2. Thereafter, the green tire 4 together with the holding mechanism 71 is transported between the mold-fixing unit 2 and the mold-lifting unit 3 by the transporting apparatus 43. As shown in FIG. 4, if the holding mechanism 71 is positioned above the center portion of the mold-fixing unit 2, by lowering the holding mechanism 71, the holding mechanism 71 is engaged to the mold-fixing unit. And, after releasing the coupling-fixture between the upper ring 19 and the lower ring mechanism 12 by means of the center post 22, the center post 22 of the holding mechanism 71 is coupled to a post lifting mechanism (not shown), as well as the switching valves 17a, 17b and the induction-heating coils 18 23, 41 are connected to a gas supplying apparatus (not shown) and the high frequency power supply 24 of FIG. 6, respectively, thereby let them to function as the center mechanism 10.

Figure 5:
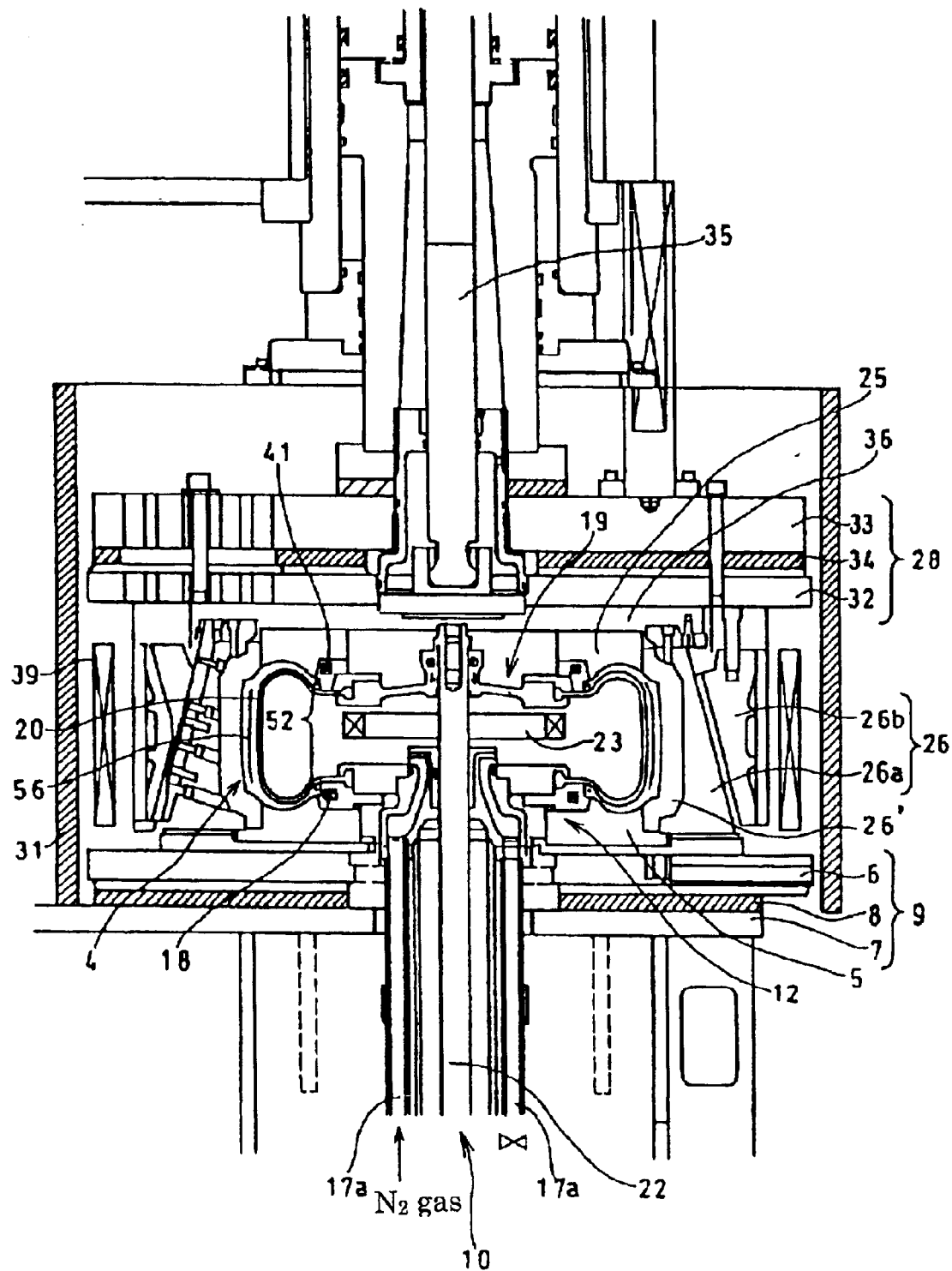
FIG. 5 is a cross sectional view schematically showing a side of a vulcanizing machine in the keeping process according to one embodiment of the invention upon completion of the clamping a green tire mold.

Next, by advancing a cylinder rod 38a from a second cylinder member 38 of FIG. 3 and advancing a rod-shaped member 35 from a first cylinder member 37, the upper heating mechanism 28 and the slide plate 36 is lowered to be disengaged each other and the slide segment 26a is moved in an outer circumferential direction. Thereafter, as shown in FIG. 4 with two dot-dashed line, by lowing the mold-lifting unit 3 while maintaining the upper heating mechanism 28 and the slide plate in a disengaged state, positioning the green tire 4 at the inner circumference side of the slide segment 26a, and then moving slide segment 26a centrally by means of the stationary ring 26b. And, as shown in FIG. 5, each slide segment 26a is contacted each other to form a tubular mold corresponded to the tread portion 4a of the green tire 4, and the upper side mold 25 and the lower side mold 5 are contacted to the upper portion and the lower portion of the mold, respectively, thereby completing the mold clamping.

High temperature vapor is supplied to the upper platen 32, the lower platen 6, and the stationary ring 26b of the split mold 26, and by heating the upper and the lower side molds 25, 5 by means of both platens 6, 32 as well as by generating heat in the slide segment 26a of the split mold 26, the green tire 4 surrounded with these molds 25, 5, 26a generate heat from outer surface sides thereof. Also, by supplying the pressure medium such as vapor, nitrogen gas under high temperature and high pressure into the bladder 20 via a gas line 17a, the green tire 4 is pressed to the inner wall surface of the mold by the bladder. And, by transferring the heat value of the pressure medium under high temperature and high pressure to the green tire 4 via the bladder 20, the green tire 4 is heated from an inner surface side thereof.

Furthermore, as shown in FIG. 6, high frequency power is supplied to each of induction-heating coils 18, 23, 41, 39 from the high frequency power supply 24. The first induction-heating coil 18 and the third induction-heating coil 41 supplied with high frequency power apply intensive high frequency magnetic field to the lower bead portion 4c and the upper bead portion 4c' of the green tire 4, respectively, thereby heating the bead wires 52, 52 provided within the both bead portions 4c, 4c' by induction firstly. Also, since the split mold 26 is formed with non-magnetic material, a fourth induction-heating coil 39 applies intensive high frequency magnetic field to the tread portion 4a of the green tire 4, thereby heating the belt member 56 provided within the tread portion 4a by induction firstly. Thereby, in the green tire 4, in addition to the heating from the outer surface side and inner surface side thereof, since heating from the inside of tire is performed in the bead portions 4c, 4c' and tread portion 4a having large thickness, temperature of the whole tire is risen up to vulcanizing temperature in a short time.

Moreover, in the green tire 4 transported from the keeping process, since the bead portions 4c, 4c' and tread portion 4a having large thickness is preheated near the vulcanizing temperature, the whole green tire 4 is risen up to vulcanizing temperature in a very short time after initiating the heating for vulcanization, even in the case where the tire is kept under room temperature condition for a long time.

Also, a process of keeping the temperature of the green tire 4 heated by induction may be provided during the time until the vulcanizing is initiated. Specifically, the green tire 4 preheated is received in a temperature keeping box, and then the heating is continued so as to maintaining the green tire 4 near the preheating temperature just before reaching to the vulcanizing process. Thereby, the green tire 4 having completed the preheating up to predetermined temperature is prevented from temperature lowering due to radiation of heat, and heat uniformity of the green tire 4 can be improved.

The second induction-heating coil 23 supplied with high frequency power applies intensive high frequency magnetic field to the magnetic member 20b of the bladder 20, thereby generating heat from the bladder 20 itself. Accordingly, upon transferring the heat value of the power medium to the green tire 4 via the bladder 20, since the delay of the heat transfer time due to the bladder 20 is suppressed minimally, the temperature of the green tire 4 is raised up to the vulcanizing temperature in a more short time. And, vulcanization of the green tire 4 is performed while the green tire 4 is maintained in a vulcanizing temperature.

During the vulcanization of the green tire 4, the bladder 20 presses the green tire 4 in a mold direction to form the green tire. At this time, since the bladder 20 is formed of a low elongation material having shape similar to that of the inner wall surface of the green tire having completed the vulcanization, the shape of the inner wall surface of the green tire having completed the vulcanization surely appeared even in the case where pressure of the pressure medium has somewhat changed. Accordingly, if the bladder 20 presses the green tire 4 to perform the forming process, a tire having completed the vulcanization which is formed in a high precision is obtained.

As such, when a vulcanized tire is obtained, as shown in FIG. 4, after having opened the mold by the operation opposite to the operation described above, the center post 22 is raised to contract the bladder 20. And, the vulcanized tire 4' is removed from the holding mechanism 71 to be taken to the outside, and the holding mechanism 71 is taken to the outside, and then the vulcanized tire 4' is transported to the later process as well as the holding mechanism 71 is transported to the forming process. Thereafter, by means of above operation, a new green tire 4 is carried in, to repeat the vulcanizing, but in the case of repeating the such vulcanizing, since the low elongation material of the bladder 20 is hard to deteriorate under high temperature condition, the low elongation material maintains its original property. Accordingly, even in the stage that the vulcanization has repeated large number of times, since the bladder 20 makes shape of the inner wall surface of the vulcanized tire to be surely appeared, it is possible to use the bladder 20 for a ring time.

As described above, in this embodiment, before vulcanizing the green tire 4 having metal members embedded therein, as shown in FIG. 1, the preheating method of the green tire by induction-heating the metal member is performed, so that the inside of the green tire of which the temperature raising is mostly delayed in vulcanization is preheat while it is heated in prior, thereby it is possible to complete the vulcanization in a short time. Specifically, at least one of the belt member 56 (metal member) and the bead wire 52 (metal member) embedded in the inside of tire, that is, the tread portion 4a and/or bead portion 4c, 4c' is heated by induction, so that particularly the inside of tire, that is the tread portion 4a and bead portions 4c, 4c' having large thickness is preheated, thereby the vulcanization can be completed more surely in a short time. Also, in this embodiment, although the case that the metal member is embedded in the tread portion 4a and bead portions 4c, 4c' was explained, the present invention is not limited to this case, and can be applied to the case that the metal member is embedded in an optional portion having large thickness. For example, in case that the metal members are embedded in the sidewalls 4b, 4b' which become the sidewall portion, at least one of the metal member embedded in the tread portion 4a, the bead portions 4c, 4c' and the sidewalls 4b, 4b' may be induction-heated.

In this embodiment, the green tire preheating method is practiced by a green tire preheating apparatus which has a loading table 82 (tire supporting means) for detachably supporting the green tire 4 in a predetermined posture, and a preheating coil 83 for applying high frequency magnetic field with respect to the green tire 4 supported on the loading table 82 (tire supporting means) to induction-heat the metal member of the green tire 4 by high frequency magnetic field.

The green tire preheating apparatus in this embodiment is constituted such that the metal members of the tread portion 4a and bead portions 4c, 4c' are induction-heated by the preheating coil 83 disposed around the green tire 4, to be preheated while holding the green tire 4 from the inside thereof by the holding mechanism 71, but the present invention is not limited to this embodiment and may be constituted such that only the green tire 4 is kept and preheated so as to be applicable to a bladder type or a bladder-less type of a vulcanizing machine.

Accordingly, the green tire preheating apparatus may have a constitution shown in FIGS. 8 to 16. The constitution of FIGS. 8(a) and (b) will be explained in detail. The green tire preheating apparatus has a loading table 90 for loading the green tire 4, and a tread portion-preheating coil 91 disposed along the tread portion 4a of the green tire 4 on the loading table 90 for generating a high frequency magnetic field. A rotational driving apparatus (not shown) is coupled to the center portion of the lower surface of the loading table 90 via a rotating shaft 95, and the rotational driving apparatus rotates the green tire 4 together with the loading table 90 horizontally when keeping the green tire 4. Inside the loading table 90, a lower bead portion-preheating coil 92 is provided, and the lower bead portion-preheating coil 92 is disposed along the lower bead portion 4c for applying an intensive high frequency magnetic field to the bead wire 52 (metal member) of the lower bead portion 4c.

Also, in the center portion of the upper surface of the loading table 90, a supporting member 93 is vertically provided. The supporting member 93 supports an upper bead portion-preheating coil 94, and the upper bead portion-preheating coil 94 is set to a coil diameter smaller than that of the hole of the green tire 4. And, the upper bead portion-preheating coil 94 is disposed along the upper bead portion 4c' at an approximately same height position as the upper bead portion 4c' for applying an intensive high frequency magnetic field to the bead wire 52 (metal member) of the upper bead portion 4c'.

In the above constitution, when keeping the green tire 4, the green tire is moved horizontally by a transporting apparatus (not shown) to be positioned above the loading table 90, and then is lowered vertically to insert the upper bead portion-preheating coil 94 through the tire hole and is loaded on the loading table 90. Thereafter, the loading table 90 and the green tire 4 rotates horizontally by the rotational driving apparatus (not shown) via the rotating shaft 95, as well as each of the preheating coils 91, 92, 94 is supplied with high frequency power from the high frequency power supply (not shown).

The tread portion-preheating coil 91 supplied with high frequency power applies high frequency magnetic field to the tread portion 4a with high magnetic flux density, to induction-heat the belt member 56 of the tread portion 4a efficiently. Meanwhile, respective bead portion-preheating coils 92, 94 apply high frequency magnetic field to the respective bead portions 4c, 4c' with high magnetic flux density, to induction-heat the bead wire 52 of the respective bead portions 4c, 4c' efficiently. By means of this, the inside of tire, particularly the tread portion 4a and bead portions 4c, 4c' having large thickness of which the temperature rising is delayed upon vulcanization, can be preheated sufficiently.

Since the green tire 4 has rotated horizontally, the tread portion-preheating coil 91 and the upper bead portion-preheating coil 94 become a state that has moved relatively along the green tire 4. Accordingly, even in the case that the preheating coils 91, 94 apply high frequency magnetic field non-uniformly to the thread portion 4a and the upper bead portion 4c', 4c' of the green tire 4 due to low assembling precision or low processing precision, high frequency magnetic field can be uniformly applied through the whole green tire 4 to induction-heat it. Thereby, it is not necessary to assemble or process the preheating coils 91, 94 with high precision, and operations for assembling and processing can be facilitated.

Figure 9A:
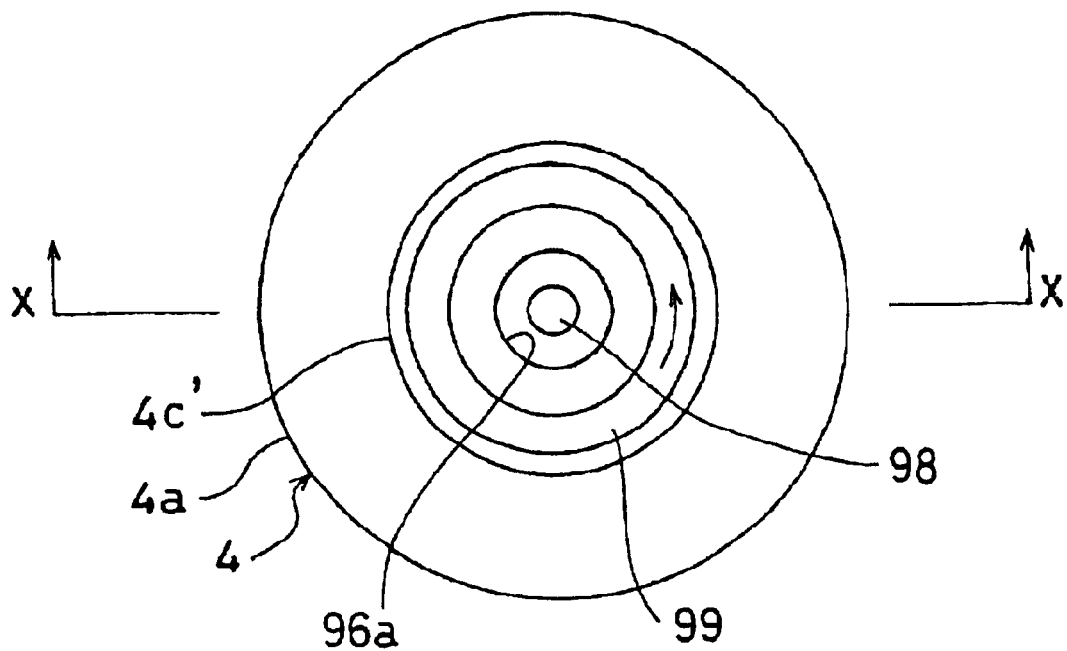
FIG. 9 is an explanatory view showing a state of keeping the green tire while preheating it in the keeping process, (a) is a plan view, and (b) is a cross section view taken along the line X—X in (a)
Figure 9B:
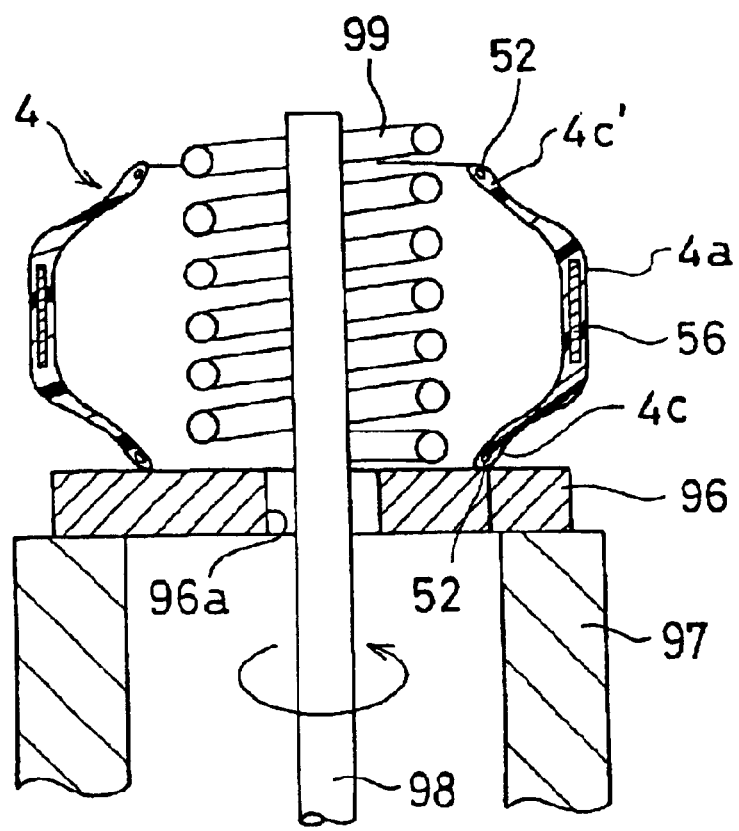

Also, the constitution of FIGS. 9(a) and (b) will be explained in detail. The green tire preheating apparatus has a loading table 96 for loading the green tire 4. The loading table 96 is supported and fixed on a supporting table 97. And, through hole 96a is formed in the center portion of the loading table 96, and a rotational supporting shaft 98 is rotatably inserted through the through hole 96a. In the upper portion of the rotational supporting shaft 98 above the loading table 96, a columnar preheating coil 99 is fixed. The columnar preheating coil 99 is set to a coil diameter smaller than the tire hole of the tire 4 so as to be inserted through the hole of the tire 4. Moreover, the columnar preheating coil 99 is formed and disposed such that both ends thereof are positioned at the both bead portions 4c', 4c, in order to apply intensive high frequency magnetic field to the bead wire 52 (metal member) of the respective bead portions 4c, 4c' and the belt member 56 (metal member) of the tread portion 4a. Meanwhile, a rotational driving apparatus (now shown) is coupled to the lower end of the rotational supporting shaft 98, and the rotational driving apparatus rotates the rotational supporting shaft 98 to swing the columnar preheating coil 99 within the green tire 4.

In the case of keeping the green tire 4, the green tire is moved horizontally by a transporting apparatus (now shown) to be positioned above the loading table 96, and then is lowered vertically to insert the columnar preheating coil 99 through the tire hole and is loaded on the loading table 96. Thereafter, the columnar preheating coil 99 is swung by the rotational driving apparatus (not shown) via the rotational supporting shaft 98 within the green tire, as well as the columnar preheating coil 99 is supplied with high frequency power from the high frequency power supply (not shown).

The columnar preheating coil 99 supplied with high frequency power applies high frequency magnetic field to the tread portion 4a and bead portions 4c, 4c' with high magnetic flux density, to induction-heat the bead wire 52 of respective bead portions 4c, 4c' as well as belt member 56 of the tread portion 4a efficiently. By means of this, the inside of tire, particularly the tread portion 4a and bead portions 4c, 4c' having large thickness of which the temperature rising is delayed upon vulcanization can be preheated sufficiently.

Since the columnar preheating coil 99 is swung about the rotational supporting shaft 98, the columnar preheating coil 99 becomes a state that has moved relatively along the green tire 4. Accordingly, even in the case that the columnar preheating coil 99 applies high frequency magnetic field non-uniformly to the thread portion 4a and the bead portions 4c, 4c' of the green tire 4 due to low assembling precision or low processing precision, high frequency magnetic field can be uniformly applied through the whole green tire 4 to induction-heat it. Thereby, it is not necessary to assemble or process the columnar preheating coil 99 with high precision, and operations for assembling and processing can be facilitated.

The constitution of FIGS. 10(*a*) and (*b*) will be explained in detail. The green tire preheating apparatus has a loading table 90 for loading the green tire 4. A rotational driving apparatus and a lifting apparatus, which are not shown are coupled to the center portion of the lower surface of the loading table 90 via a rotating shaft 95, and the rotational driving apparatus rotates the green tire 4 together with the loading table 90 horizontally when keeping the green tire 4. Also, the lifting apparatus raises the loading table 90 up to the keeping position shown by solid line when keeping the green tire, and lowers the green tire 4 to the carrying in and out position shown by two dot-dash when carrying in and out the green tire 4.

Inside the loading table 90, a lower bead portion-preheating coil 92 is provided, and the lower bead portion-preheating coil 92 is disposed along the lower bead portion 4c for applying an intensive high frequency magnetic field to the bead wire 52 (metal member) of the lower bead portion 4c. Meanwhile, above the loading table 90, an upper bead portion-preheating coil 100 is disposed. The upper bead portion-preheating coil 100 is set to a coil diameter approximately corresponded to the tire diameter of the green tire 4. And, the upper bead portion-preheating coil 100 is disposed along the upper bead portion 4c' above and in the vicinity of the upper bead portion 4c' for applying an intensive high frequency magnetic field to the bead wire 52 (metal member) of the upper bead portion 4c'.

Furthermore, the green tire preheating apparatus has a local preheating coil 101 formed with inverse U shape. When the green tire 4 is loaded on the loading table 90 and is raised up to the keeping position (shown by solid line), the local preheating coil 101 is disposed to be matched with a part of the tread portion 4a of the green tire 4. And, the local preheating coil 101 is connected to a high frequency power supply 102, and applies high frequency magnetic field to the tread portion 4a by the power supply from the high frequency power supply 102.

In the case of keeping the green tire 4, the loading table 90 is lowered to the carrying in and out position, and then the green tire 4 is moved by a transporting apparatus (not shown) to be positioned between the loading table 90 and the upper bead portion-preheating coil 100. And, the green tire 4 is lowered vertically to be loaded on the loading table 90. Thereafter, by raising the loading table 90 up to the keeping position shown by solid line, the green tire 4 on the loading table 90 approaches to the local preheating coil 101 and the upper bead portion-preheating coil 100.

In this manner, if the green tire 4 is set to the keeping position, the green tire 4 is rotated horizontally by the rotational driving apparatus (not shown) via the loading table 90, and each of the preheating coils 92, 100, 101 is supplied with high frequency power from the high frequency power supply 102. The lower bead portion-preheating coil 92 and the upper bead portion-preheating coil 100 supplied with high frequency power apply high frequency magnetic field to the whole bead portions 4c, 4c' with high magnetic flux density, to induction-heat the whole bead wire 52 of the bead portions 4c, 4c' efficiently.

Also, the local preheating coil 101 efficiently induction-heats a part of the belt member 56 of the tread portion 4a, that is, a part mostly approached to the coil 101. At this time, since the green tire 4 has rotated horizontally, the local preheating coil 101 becomes a state of moving relatively along the tread portion 4a of the green tire 4. Accordingly, even in the case that the local preheating coil 101 has heated a part of the tread portion 4a, it becomes the state equivalent to the case that high frequency magnetic field for induction-heat is applied uniformly over the whole thread portion 4a by the rotation of the green tire 4. As a result of this, in comparison with the case that the preheating coil is formed so as to surround the whole tread portion 4a, the local preheating coil 101 can be formed in a small size, thereby it is possible to make the green tire preheating apparatus be compact and low power consumption.

Furthermore, since the green tire 4 is rotated, the upper bead portion-preheating coil 100 becomes a state of moving relatively along the green tire 4. Accordingly, even in the case that the upper bead portion-preheating coil 100 apply high frequency magnetic field non-uniformly to the upper bead portion 4c' of the green tire 4 due to low assembling precision or low processing precision, high frequency magnetic field for induction-heat can be uniformly applied over the whole green tire 4. Thereby, it is not necessary to assemble or process the upper bead portion-preheating coil 100 with high precision, and operations for assembling and processing can be facilitated.

Figure 8A:
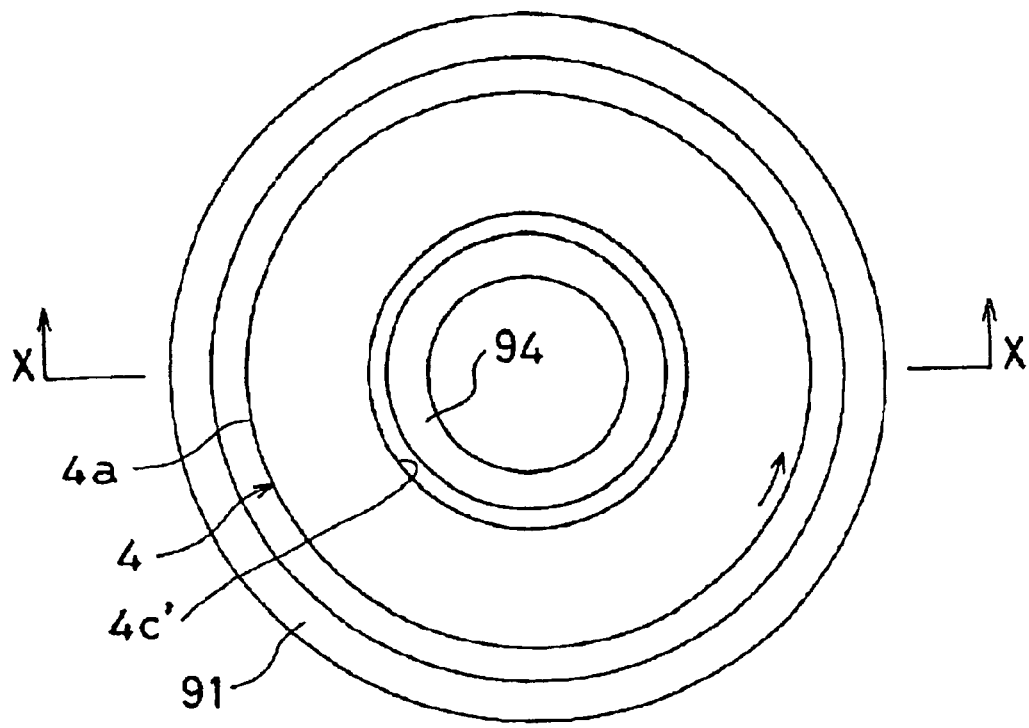
FIG. 8 is an explanatory view showing a state of keeping the green tire while preheating it in the keeping process, (a) is a plan view, and (b) is a cross section view taken along the line X—X in (a)
Figure 8B:
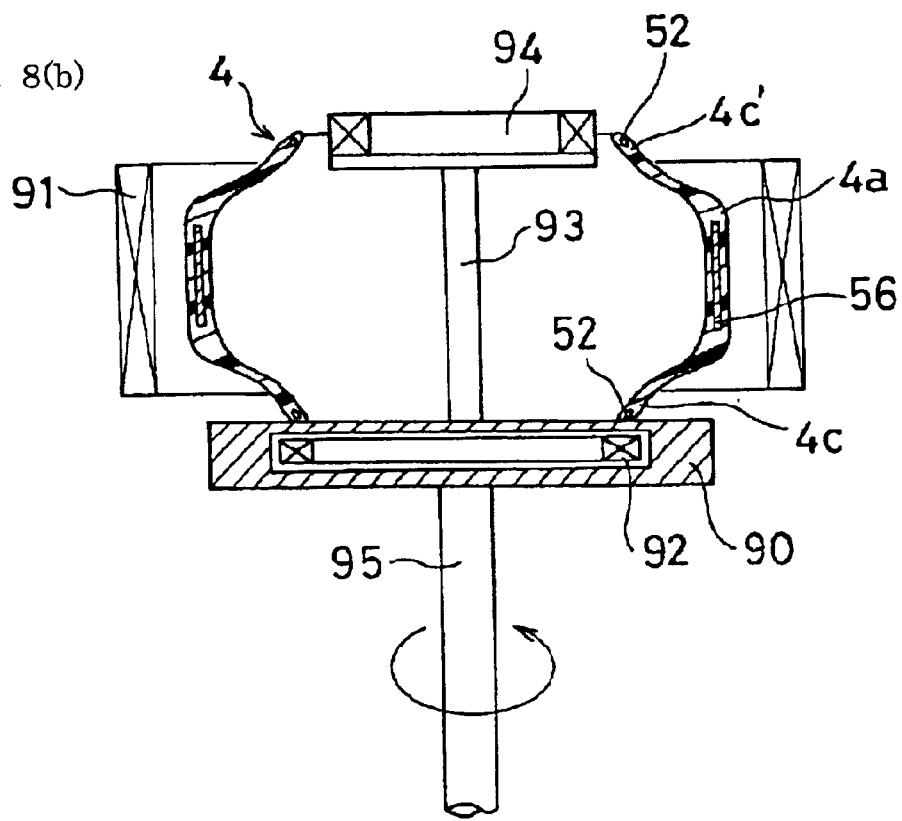
Figure 10A:
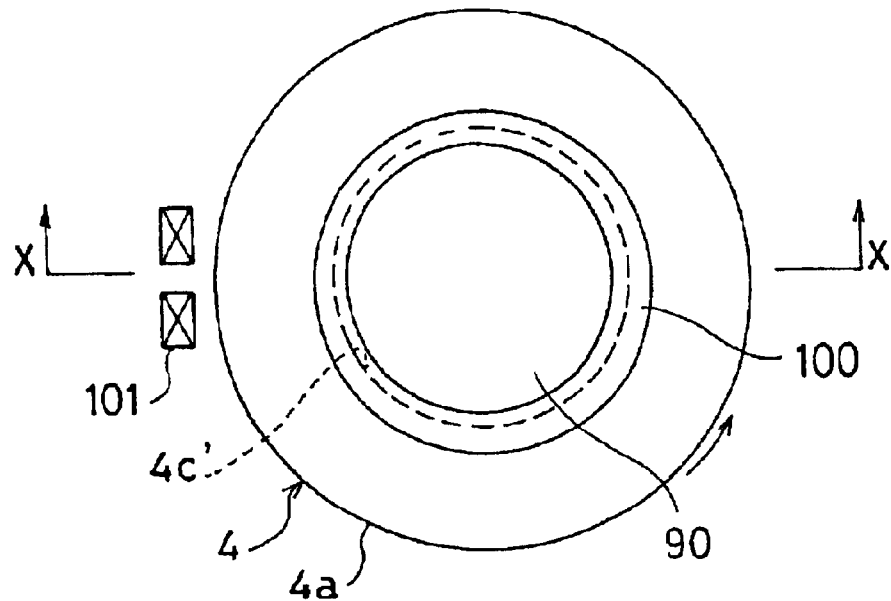
FIG. 10 is an explanatory view showing a state of keeping the green tire while preheating it in the keeping process, (a) is a plan view, and (b) is a cross section view taken along the line X—X in (a)
Figure 10B:
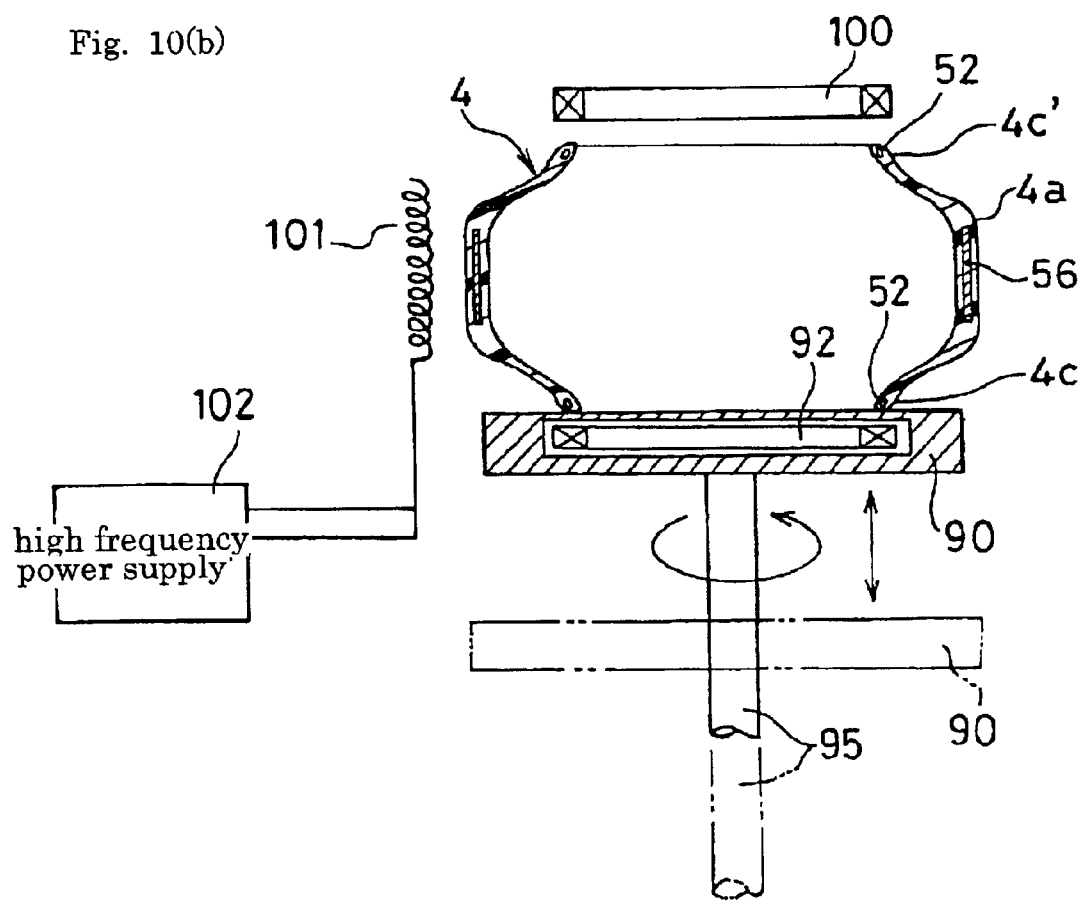

In the green tire preheating apparatus of FIGS. 8 and 10, a moving mechanism for rotating one of the green tire 4 and the preheat coil (upper bead portion-preheating coil 94, etc.) is constituted by the rotational driving apparatus (not shown) or the rotating shaft 95, etc., but the present invention is not limited to these embodiments. Namely, the moving mechanism may be a constitution that has moving means for performing at least one of rotational moving of the loading table 90 and swivel moving of the preheating coil, so as to relatively moving the preheating coil along the green tire 4 on the loading table 90 (tire supporting means) in the circumferential direction of the green tire 4.

Figure 11A:
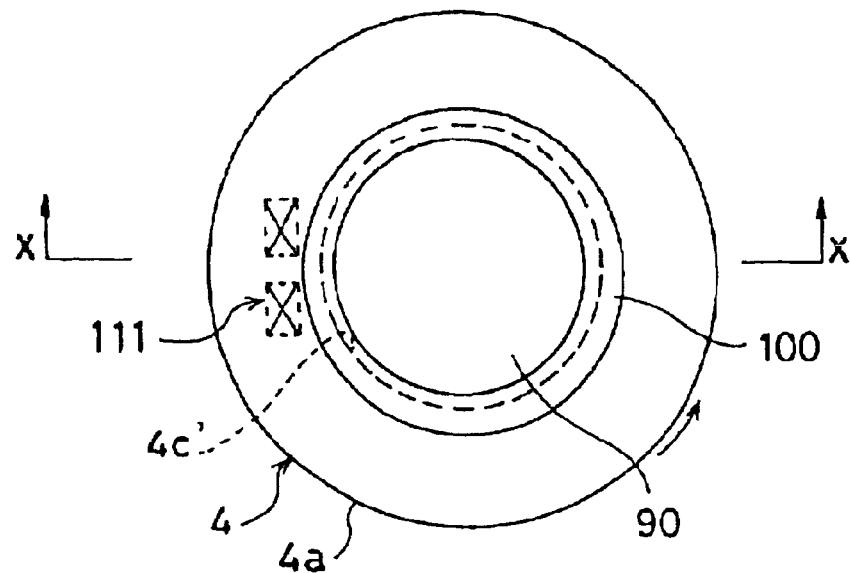
FIG. 11 is an explanatory view showing a state of keeping the green tire while preheating it in the keeping process, (a) is a plan view, and (b) is a cross section view taken along the line X—X in (a)
Figure 11B:
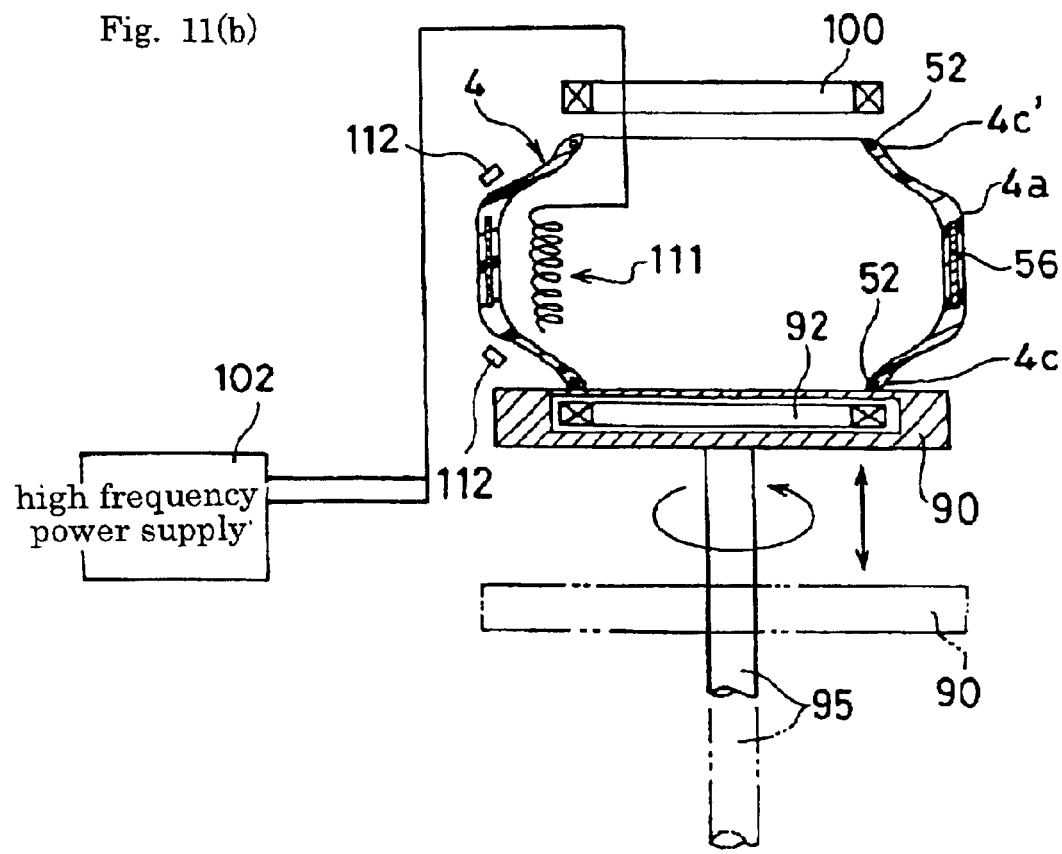

As shown in FIG. 11, a local preheating coil 111 can be disposed inside the green tire 4. The difference from the FIG. 10 is that the local preheating coil 111 for the tread of the green tire 4 is disposed inside the green tire 4 so as to be corresponded to a part of the tread portion 4a. The other features are similar to those of FIG. 10, so that same reference numerals are given and detail descriptions thereof are omitted. When the loading table 90 having the green tire 4 loaded thereon is raised up to a keeping position (shown by solid line), the local preheating coil 111 is moved toward the outside and is disposed inside the green tire 4 so as to be corresponded to a part of the tread portion 4 of the green tire 4.

As shown in FIG. 10, when the local preheating coil 101 is disposed outside the green tire 4, there has been a case that a distance between the coil 101 and the metal belt member 56 becomes more distant depending on type of the tire. However, an inner liner portion at the inner surface side of the green tire 4 has sufficiently thin structure and thickness change thereof is small, contrary to the tread layer having large thickness at the outside of the green tire. Accordingly, as shown in FIG. 11, by disposing the local preheating coil 111 inside the green tire 4 so as to be corresponded to a part of the tread portion 4a of the green tire, a distance between the coil 111 and the metal belt member 56 becomes near, and it becomes possible to apply a sufficient alternating magnetic field to the belt member (metal member) 56.

Also, in order to induce high frequency magnetic field to be formed by the local preheating coil 111 to the metal belt member 56, it is possible to dispose the magnetic material 112, 112 so as to be corresponded to a part of the tread portion 4a of the green tire. Since the alternating magnetic field generated around the local preheating coil 111 passes through the metal belt member 56 within the green tire 4 by way of the magnetic materials 112, 112, magnetic flux density passing through the metal belt member 56 becomes large and a circumferential part of the belt member 56 of the tread portion 4a is induction-heated efficiently. At this time, since the green tire 4 is rotated, the local preheating coil 111 and the magnetic material 112 become a state of moving relatively along the tread portion 4a of the green tire 4. Accordingly, even in the case that the local preheating coil 111 has heated a part of the tread portion 4a, it becomes the state equivalent to the case that high frequency magnetic field for induction-heat is applied uniformly over the whole thread portion 4a by the rotation of the green tire 4.

Figure 12A:
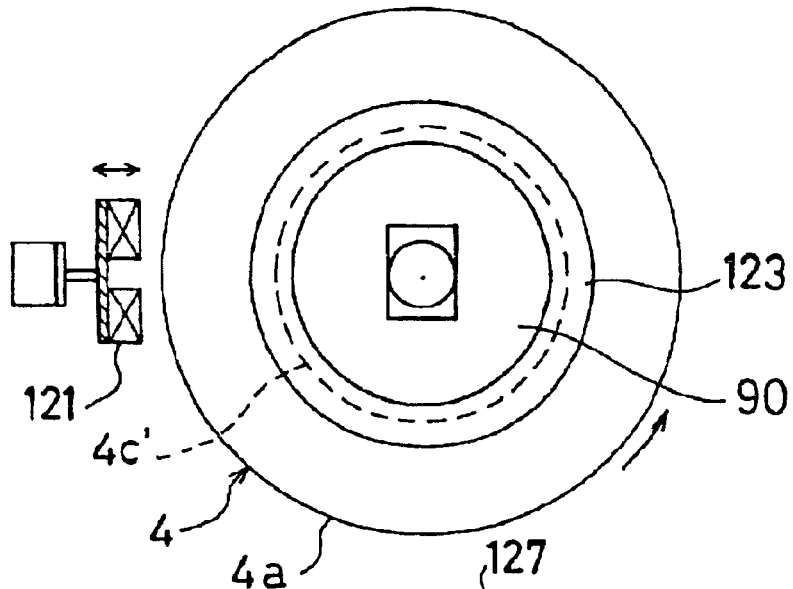
FIG. 12 is an explanatory view showing a state of keeping the green tire while preheating it in the keeping process, (a) is a plan view, and (b) is a cross section view taken along the line X—X in (a)
Figure 12B:
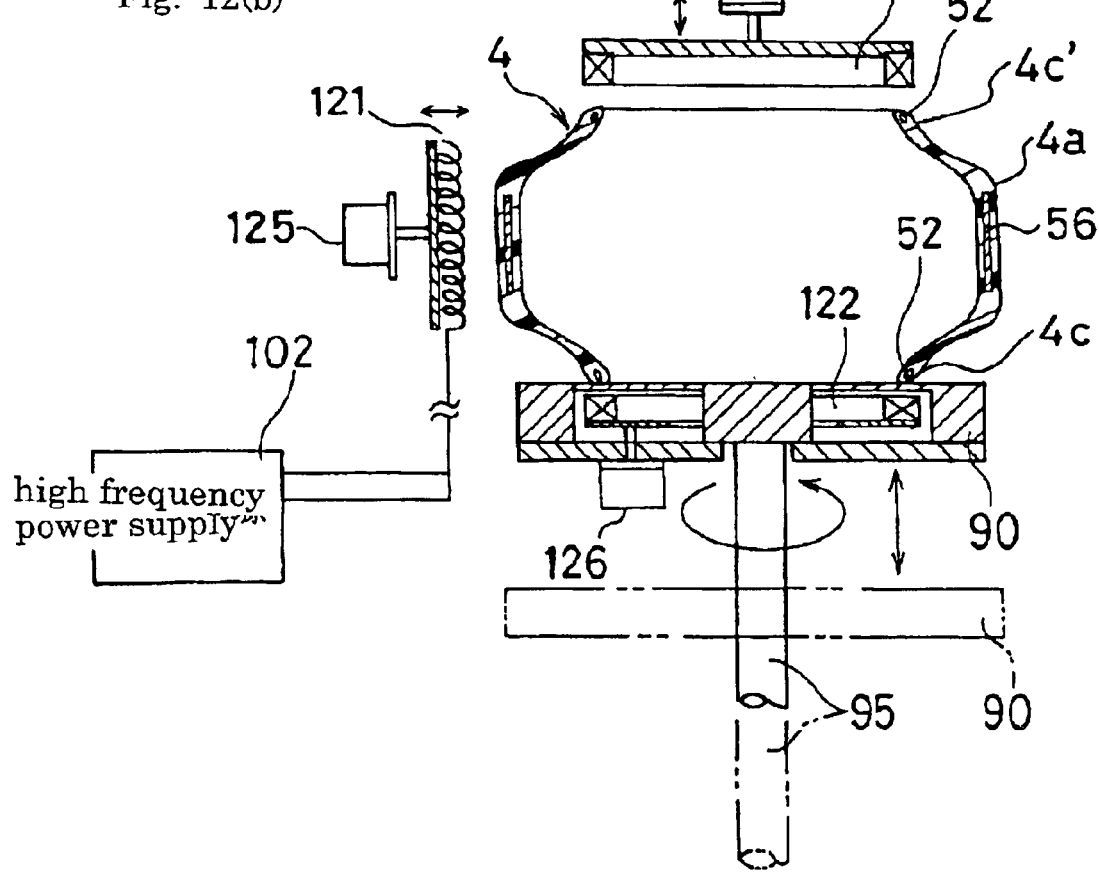

As shown in FIG. 12, it is possible the change the relative positional relationship between the local preheating coil, etc. and the green tire. The difference from the FIG. 10 is that a local preheating coil 121, a lower bead portion-preheating coil 122, and an upper bead portion-preheating coil 123 are connected to hydraulic servo actuators 125, 126, 127, respectively, which are relative distance adjusting means. The other features are similar to those of FIG. 10, so that same reference numerals are given and detail descriptions thereof are omitted. By operating the hydraulic servo actuators 125, 126, 127, it is possible to move the local preheating coil 121 in radial direction of the green tire 4 and to move the lower bead portion-preheating coil 122 and the upper bead portion-preheating coil 123 vertically, respectively.

Here, the magnetic flux densities of the alternating magnetic field to be generated at the periphery of the induction-heating coil are vary depending on the distance from the induction-heating coil. Accordingly, by moving each preheating coil to adjust the distance from the green tire, the magnetic flux density passing through each metal member can be properly adjusted depending on the material constitution and shape, so that it is possible to heat the green tire efficiently.

Although the hydraulic servo actuators 125, 126, 127 are used as relative distance adjusting means in FIG. 12, the design may suitably be changed for example, by using the mechanism combining a motor with a rack and pinion. Moreover, in this embodiment, the coils 121, 122, 123 move with respect to the green tire 4, but to the contrary, the green tire 4 may move with respect to the coils 121, 122, 123 by providing the green tire 4 with relative distance adjusting means.

Figure 13A:
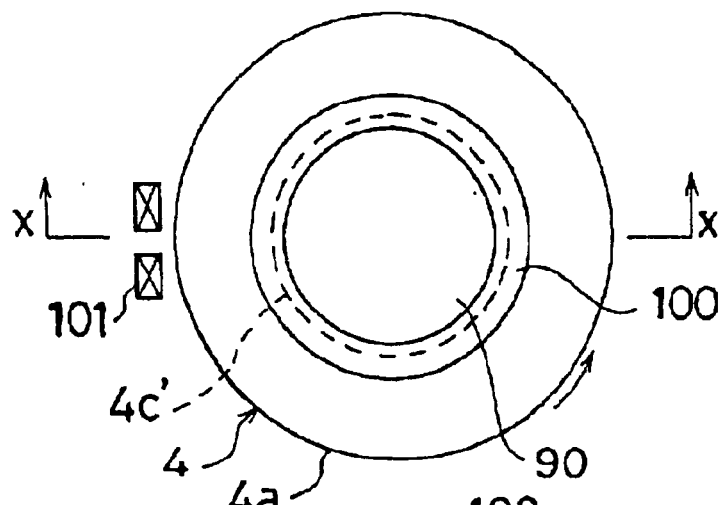
FIG. 13 is an explanatory view showing a state of keeping the green tire while preheating it in the keeping process, (a) is a plan view, and (b) is a cross section view taken along the line X—X in (a)
Figure 13B:
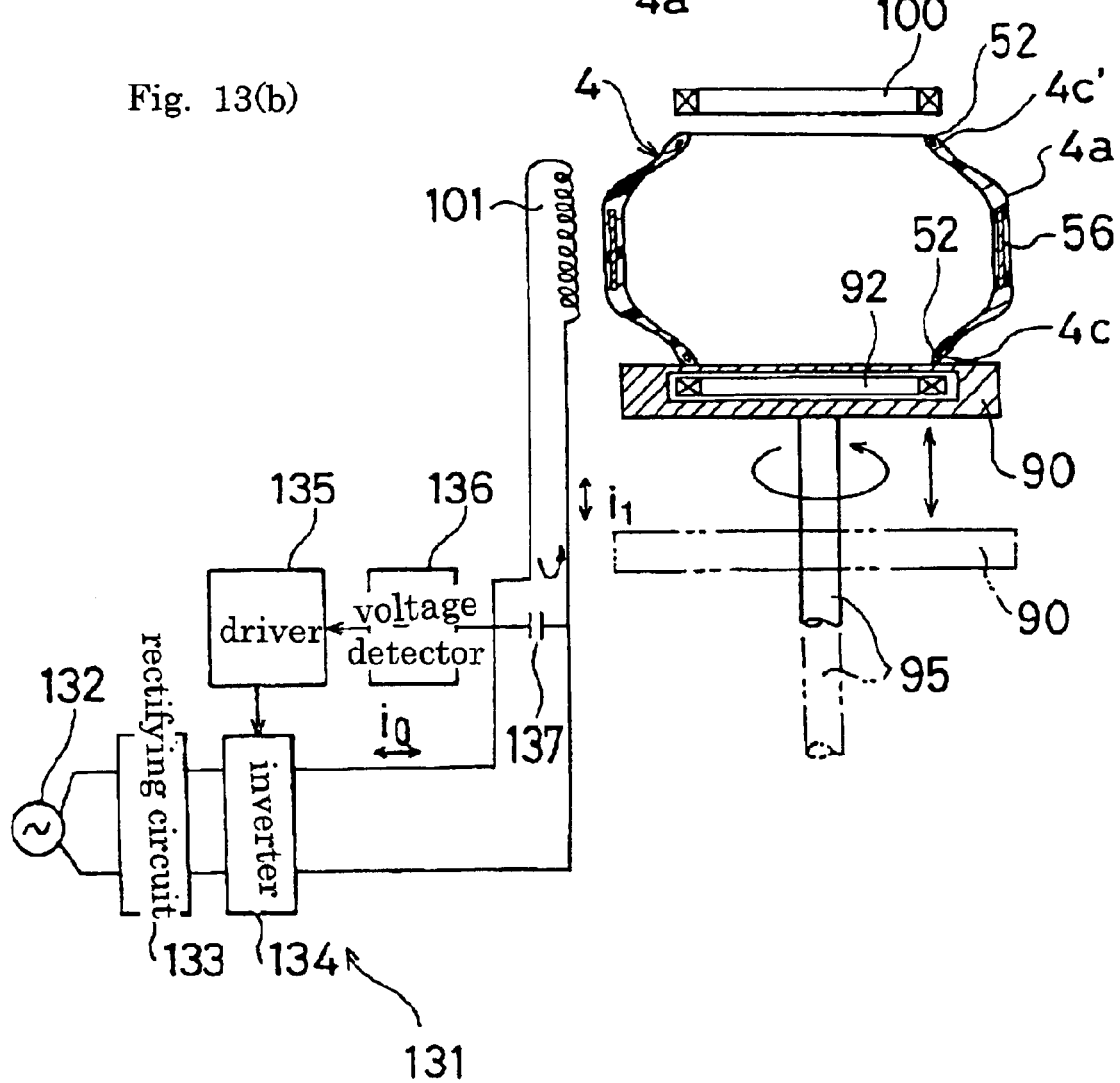

As shown in FIG. 13, it is possible to change the frequency in the local preheating coil and the like. The difference from the FIG. 10 is that high frequency power supply circuit having frequency changing means for the local preheating coil 101 is shown. The other features are similar to those of FIG. 10, so that same reference numerals are given and detail descriptions thereof are omitted. The high frequency power supply circuit 131 is constituted, by having an AC power supply 132, a rectifying circuit 133, an inverter 134, a driver 135, a voltage detector 136, and resonance condenser 137.

The AC power supply 132 is converted into DC by the rectifying circuit 133 and converted into AC power supply having predetermined frequency by ON and OFF of the switching element of the inverter 134. ON and OFF of the switching element of the inverter 134 is controlled by the driver 135. Namely, the driver 135 can change the frequency over a wide range. By the driver 135 which is a frequency changing means, the AC power supply frequency can be changed preferably in a 50 Hz~100 KHz, more preferably in a 10~30 KHz. Since the constitution of the metal belt member 56 becomes different depending on the size and type of the green tire, by changing into and setting suitable frequency according to its wire diameter, current infiltration depth, it is possible to improve the heat generation efficiency and to suppress the variation of the heat generation of the belt member 56.

Since the belt member 56 exists inside the insulating material and is formed of fine metal wire or metal plate, cross sectional area to which magnetic field emitted from the local preheating coil 101 is directed is small, and induction over-current is hard to flow. Namely, the power-factor of the high frequency power supply circuit 131 becomes low. Therefore, it is desirable to connect the condenser 137 for generating the resonance current to the local preheating coil 101 in parallel or in series. For example, if switching frequency of the inverter 134 is f0, electrostatic capacity of the condenser 137 is determined such that resonance frequency of the condenser 137 becomes f1=f0×n (integer more than 2). Then, current i1 flowing through the coil 101 becomes more than two times with respect to current i0 at the inverter 134, and current amount of wiring to the inverter 134 and the condenser 137 becomes small to suppress heat generation, thereby power-factor of the whole high frequency power supply circuit 131 is improved.

The method of determining uniquely the resonance frequency f1 of the condenser 137 from the frequency f0 of the inverter 134 was explained, but the method of providing the voltage detector 136 for detecting the voltage of the condenser 137, and corresponding to optional frequency of the inverter 134 may be employed. The voltage detector 136 measures voltage at both ends of the condenser 137 in a real time, and ON and OFF timing of the switching element of the inverter 134 is performed by the feedback value of said voltage value. Specifically, control to make switch of the inverter ON near the time of completing one cycle of resonance between condenser 137 and coil 101 is performed.

Now, high frequency power supply circuit provided with the frequency changing means to the local preheating coil 101 for the tread is shown, but same effect is attained by forming the high frequency power supply circuit provided with the frequency changing means to the local preheating coil 101 for the bead portion.

Figure 14A:
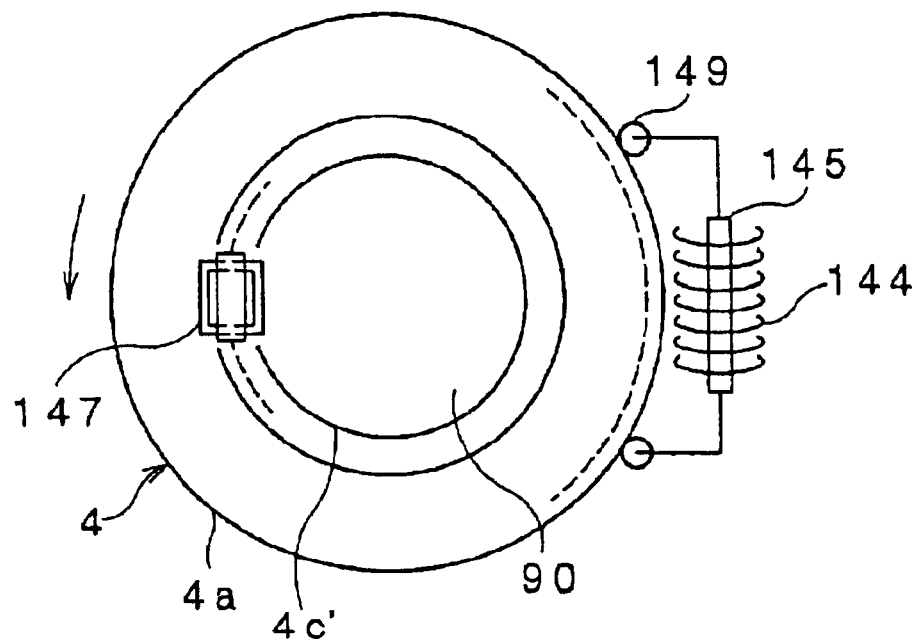
FIG. 14 is an explanatory view showing a state of keeping the green tire while preheating it in the keeping process, (a) is a plan view, and (b) is a cross section view taken along the line X—X in (a)
Figure 14B:
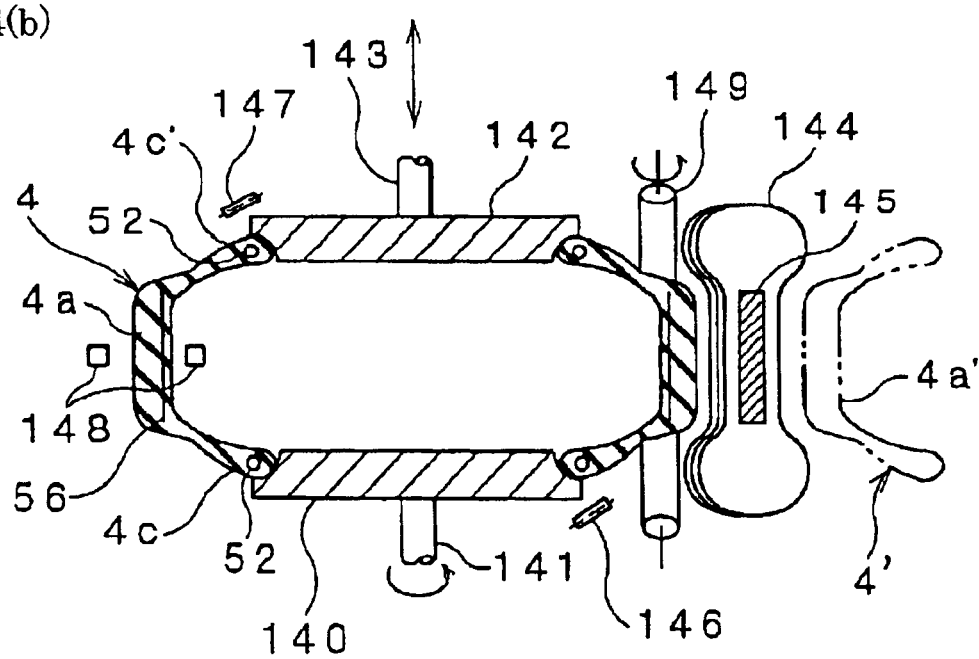

Also, forms of preferable induction heating will be described with reference to FIG. 14. The constitution of FIGS. 14(*a*) and (*b*) will be explained in detail. The green tire preheating apparatus has a loading table 140 for loading the green tire 4, a tread portion-preheating coil 144 disposed to be corresponded to the tread portion 4*a* of the green tire 4 on the loading table 140 for generating high frequency magnetic field, and bead portion-preheating coils 146, 147 disposed to be corresponded to the bead portions 4*c*, 4*c*' of the green tire 4 for generating high frequency magnetic field. In the center portion of the lower surface of the loading table 140, a rotational driving apparatus (not shown) is coupled via a rotating shaft 141, and the rotational driving apparatus rotates horizontally the green tire together with the loading table 140 when keeping the green tire 4. Also, a supporting member 142 is disposed above the loading table 140, and a lifting apparatus (not shown) is coupled to a center portion of the upper surface of the supporting member 142 via a supporting shaft 143.

The tread portion-preheating coil 144 is disposed outside the green tire so as to be corresponded to a part of the tread portion 4*a* of the green tire 4. The tread portion-preheating coil 144 is a coil wound in spiral shape, and has a core (magnetic material) disposed therein. Also, the tread portion-preheating coil 144 has a shape to be corresponded to shape of the tread portion 4*a*. Here, the tread portion-preheating coil 144 is disposed such that the magnetic field direction of high frequency magnetic field to be formed around the tread portion-preheating coil 144 coincides with a direction following a part of the circumferential direction of the metal belt member 56 of the tread portion 4*a*.

The lower bead portion-preheating coil 146 is disposed along the lower bead portion 4*c* below and in the vicinity of the lower bead portion 4*c* for applying an intensive high frequency magnetic field to the bead wire 52 (metal member) of the lower bead portion 4*c*. The lower bead portion-preheating coil 146 is a coil which is wound in a spiral shape facially, and the spiral coil is constituted by the electric wire winding bundled with a coil so as to surround around the center through portion. Here, the lower bead portion-preheating coil 146 in which the electric wire winding is more than 60 mm and width of the center through portion is about the same as that of the electric wire winding.

On the other hand, the upper bead portion-preheating coil 47 is disposed along the upper bead portion 4*c*' above and in the vicinity of the upper bead portion 4*c*' for applying an intensive high frequency magnetic field to the bead wire 52 (metal member) of the upper bead portion 4*c*'. As the upper bead portion-preheating coil 147, one that has same shape as the lower bead portion-preheating coil 146 is used.

Each one of temperature sensor 148 is disposed at the inner surface and outer surface of the tread portion of the green tire 4, respectively. By detecting the temperature of the inner surface and the outer surface of the green tire 4 using the temperature sensor 148, it is possible to practice the control for maintaining at a desirable temperature by estimating the temperature of the metal belt member 56 of the tread portion 4*a*. Here, the quantity and the disposing position of the temperature sensor to be disposed for detecting the outer surface temperature of the green tire 4 may be suitably changed. Moreover, any of the contact type or non-contact type of temperature sensor may be used. Also, the temperature sensor can be used not only for the control but also for the error detection. For example, by detecting the temperature rising ($\Delta T°$ C.) after 2~3 minutes from preheating initiation, weather the preheating state is good or not is decided.

Also, a guide roller 149 is mounted so as to contact with outer surface of the green tire 4. When the green tire 4 together with the loading table 140 and the rotational supporting member 142 rotates horizontally upon keeping, the green tire 4 is rotated while outer surface thereof is guided in the guide roller 149. Also, it is possible to dispose the guide roller 149 so as to contact with inner surface of the green tire.

The tread portion-preheating coil 144 is disposed between the green tire 4 and the green tire 4' mounted opposite to the green tire 4, and is disposed along a part of respective tread portions 4*a*, 4*a*' of the green tire 4 and the green tire 4'.

In the above constitution, when keeping the green tire 4, the green tire is moved horizontally by a transporting apparatus (not shown) to be positioned above the loading table 140, and then is loaded on the loading table 140 by vertically lowering the supporting member 142. Thereafter, the loading table 140 and the green tire 4 rotate horizontally by the rotational driving apparatus (not shown) via the rotating shaft 141, as well as each of the preheating coils 144, 146, 147 is supplied with high frequency power from the high frequency power supply (not shown).

The tread portion-preheating coil 144 supplied with high frequency power applies high frequency magnetic field to the tread portion 4*a* with high magnetic flux density, to induction-heat the belt member 56 of the tread portion 4*a* efficiently. Particularly, in the case where high frequency magnetic field is formed in a circumferential direction of the metal belt member 56 of the tread portion 4*a*, since high frequency magnetic field is formed along the metal belt member 56, magnetic flux density passing through the metal belt member 56, 56 becomes large and a circumferential part of the belt member 56 of the tread portion 4*a* can be induction-heated efficiently.

Meanwhile, respective bead portion-preheating coils 146, 147 apply high frequency magnetic field to the respective bead portions 4*c*, 4*c*' with high magnetic flux density, to induction-heat the bead wire 52 of the respective bead portions 4*c*, 4*c*' efficiently. Particularly, in the case where spiral bead portion-preheating coils 146, 147 are used, high frequency magnetic field is formed along the circumferential direction of the bead wire 52 (metal member) of the lower bead portion 4*c* and the upper bead portion 4*c*'. Accordingly, even in the case that the outer surface of the green tire and coil are apart from each other, it is possible to apply sufficient alternating magnetic field particularly to the bead wire 52 of the bead portions 4*c*, 4*c*' having large thickness of which the temperature rising is delayed upon vulcanization.

Since the green tire 4 has rotated horizontally, the tread portion-preheating coil 144, the lower bead portion-preheating coil 146 and the upper bead portion-preheating coil 147 become a state of moving relatively along the green tire 4. Accordingly, even in the case that the preheating coils 144, 146, 147 apply high frequency magnetic field non-uniformly to the thread portion 4*a*, the lower bead portion 4*c* and the upper bead portions 4*c*' of the green tire 4 due to low assembling precision or low processing precision, high frequency magnetic field for induction-heat can be uniformly applied through the whole green tire 4. Thereby, it is not necessary to assemble or process the preheating coils 144, 146, 147 with high precision, and operations for assembling and processing can be facilitated.

Additionally, since by providing the guide roller for guiding the outer surface of the green tire 4, relative distance between the metal belt member 56 of the tread portion 4a and the tread portion-preheating coil 144 is kept constant and magnetic flux density of the magnetic field passing through the belt member 56 can be maintained constant, so that temperature irregularity of the heating portion can be reduced.

Also, thread portion-preheating coil 144 is disposed between the green tire 4 and green tire 4' and rotates respectively, so that the metal belt member 56 of tread portions 4a, 4a' of the green tire 4 and green tire 4a' can be induction-heated at the same time. Also, by connecting a plurality of coils to one high frequency power supply, the plurality of the green tire preheating apparatus can be controlled with integrated form. By having above constitution, since it is unnecessary to mount individually the high frequency power supply and the coil with respect to each green tire preheating apparatus, cost of green tire preheating apparatus can be saved.

In the above embodiment, the heating apparatus of the present invention is explained mainly regarding to a preheating apparatus, but may be applied to the vulcanizing apparatus by changing its shape suitably.

Figure 15A:
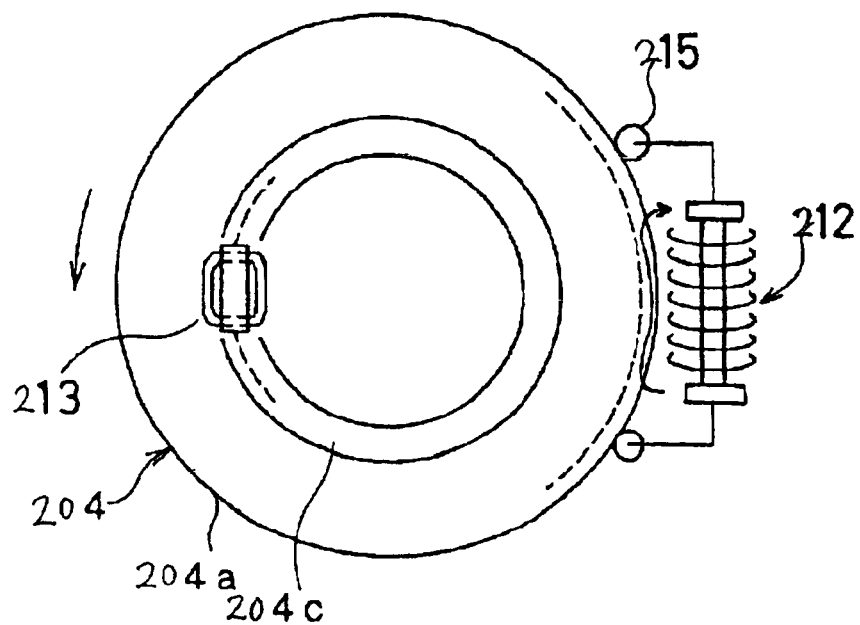
FIG. 15 is a schematic view showing a green tire preheating apparatus according to one embodiment of the invention.
Figure 15B:
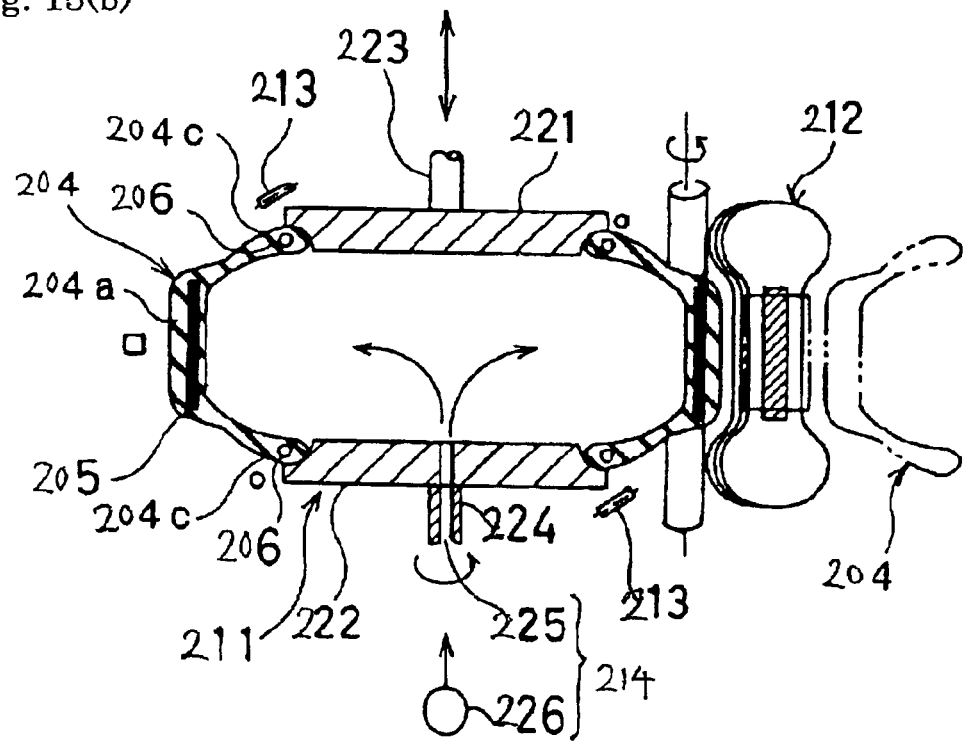

A green tire preheating apparatus and method according to another embodiment of the present invention will be explained with reference to FIG. 15. FIG. 15(a) is a top view of main part of the green tire preheating apparatus 201, and FIG. 15(b) is a side cross sectional view of main part of the green tire preheating apparatus 201.

The constitution of an apparatus shown in FIG. 15 will be explained. A green tire preheating apparatus 201 comprises a holding mechanism 211 for rotatably holding a green tire 204, a local preheating coil 212 for a tread portion(first coil means), a local preheating coil 213 for a pair of bead portion (second coil means), a pressing means 214 for pressing the inside of the green tire 214 to be held by the holding mechanism 211.

In FIG. 15, the holding mechanism 211 has an upper supporting plate 221 for an upper bead portion 204c of the green tire 204, a lower supporting plate 222 for a lower bead portion 204c of the green tire 204, a supporting shaft 223 for the upper supporting plate 221, and a rotating shaft 224 for the lower supporting plate 222. A lifting apparatus (not shown) is coupled to the supporting shaft 223, and the upper supporting plate 221 is adapted to freely move up and down when attaching and detaching the green tire 204. A rotational driving apparatus (not shown) is coupled to the rotating shaft 224, and the rotating shaft can rotate the green tire 204 horizontally. The pressing means 214 consists of a central passage 225 of the rotating shaft 224, and a pressure fluid supplying source 226 to the passage 225. When the pressure fluid is supplied inside the green tire 204 tightly held at a part of the bead portion 204c through the passage 225, the green tire 204 expands to a predetermined shape and does not cause a deformation.

The local preheating coil 212 for the thread portion 204a (first coil means) is disposed outside the green tire 204 along a part of the tread portion 204a of the green tire 204. As shown in FIG. 16, the local preheating coil 212 has a coil 231, center core 232, and side cores 233, 233. The coil 231 is wound around the planar center core 232, and both ends thereof become a hollow core-shaped enlarged portion or a deformed portion 231a to swell toward a sidewall portion 204b. The side cores 233, 233 have a width larger than the thickness of the center core 232, and are formed with a protruded portion or a deformed portion 233a, 233a, which is protruded toward the shoulder portion 204. The high frequency magnetic field from the coil 231 is formed in a roof shape in a circumferential direction via the center core 232 and side cores 233, 233. A steel belt 205 is present in a circumferential direction of the green tire 204 and high frequency magnetic field is formed along the steel belt 205, so that the magnetic field is concentrated on the steel belt 205 to perform electromagnetic induction heating efficiently.

Both ends in a width direction of the steel belt 205 is positioned up to center of the shoulder portion at an end of the side wall portion 204b, and if the heat generation density of the steel belt 205 is uniform, the heating of the shoulder portion at the end of the side wall portion 204b tends to be delayed compared to the center portion of the tread portion 204a. Also, steel belt 205 itself is curved in a width direction, and distance between the ends in a width direction of the coil 231 and the steel belt 205 becomes distant at the shoulder portion at the end of the side wall portion 204b compared to the center portion of the tread portion 204a. Therefore, it is necessary to increase the magnetic flux density at both ends in a width direction of the steel belt 205 and promote the heating of the shoulder portion at the end of the side wall portion 204b, then the upper and the lower of the coil 231 become an enlarged portion or a deformed portion, and high frequency magnetic field is curved toward the side wall portion 204b. Also, due to the projected portion or the deformed portion 233a, 233a of the side cores 233, 233, the shoulder portion at the end of the sidewall portion 204b has a magnetic flux denser than that at the center portion of the tread portion 204a. As such, by means of the enlarged portion or the deformed portion 231a of the coil 231 and/or the projected portion or the deformed portion 233a, 233a of the side cores 233, 233, which increase the magnetic flux at the shoulder portion at the end of the sidewall portion 204b than that at the center portion of the tread portion 204a, it is possible to heat width direction of the green tire 204 uniformly and to reduce the temperature irregularity. Also, in the case where the thickness of the shoulder portion at the end of the sidewall portion 204b is thicker than that of the center portion of the tread portion 204a, such as a tire for RV vehicle or truck/bus, by further increasing the magnetic flux at the shoulder portion, it is possible to heat the shoulder portion intensively than the center portion of the tread portion 204a.

Figure 17A:
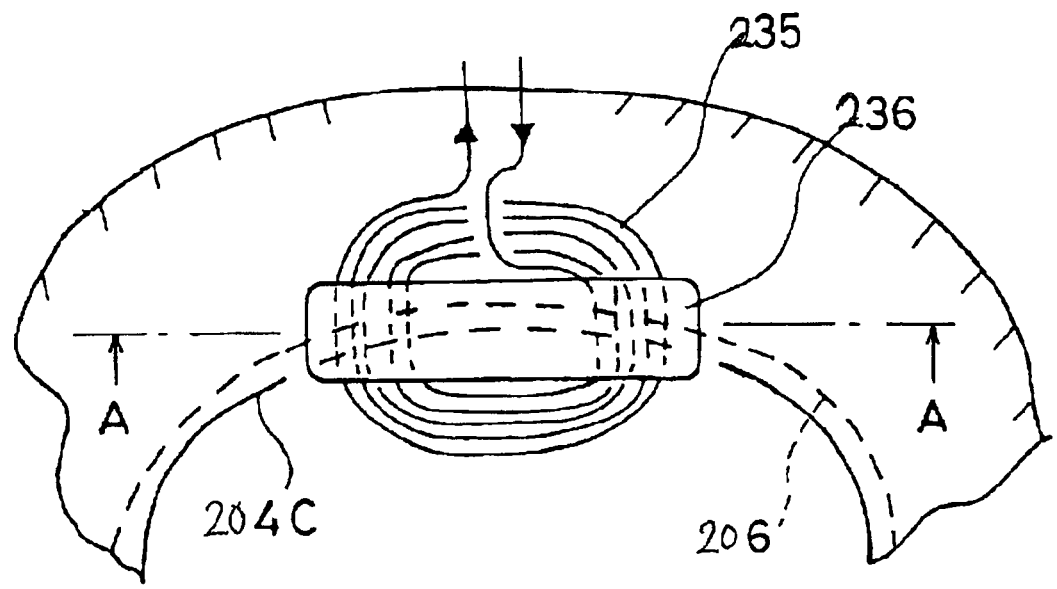
FIG. 17 shows a second coil means, which forms a high frequency magnetic field to a wire-ring-shaped metal member in a peripheral direction.

Again referring to FIG. 15, a pair of the local preheating coils 213 (second coil means) for the bead portion 204c is disposed along the lower bead portion 4c below and in the vicinity of the lower bead portion 204c for applying an intensive high frequency magnetic field to the bead wire 206 (metal member) of the lower bead portion 204c, and is disposed along the upper bead portion 4c above and in the vicinity of the upper bead portion 204c for applying an intensive high frequency magnetic field to the bead wire 206 (metal member) of the upper bead portion 204c. As shown in FIG. 17, the local preheating coil 213 for the bead portion has a constitution that coil 235 is wound in a spiral shape facially and core 236 is positioned at one surface of the coil 235.

Figure 17B:
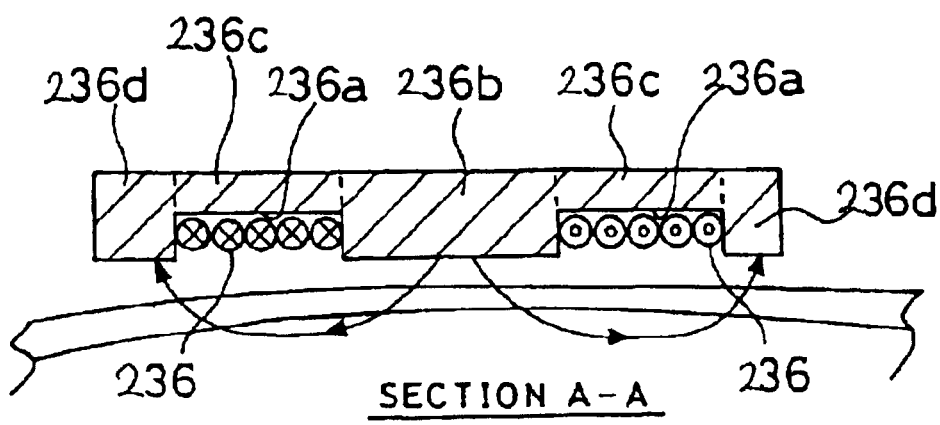

The spiral coil 235 is constituted by the electric wire winding bundled with a coil so as to surround around the center through portion. Here, the coil of which the electric wire winding is more than 60 mm and width of the center through portion is about the same as the electric wire winding. The electric wire winding has an elliptical shape and is disposed so as to have long axis in the extending direction of the bead portion 204c. The core 236 has an elongate shape extending along the long axis of the elliptical coil 235 wound spirally and is exposed at a short axis side of the coil 235. As shown in FIG. 17(b), the core 236 has recesses 236a, 236a through which the coil 235 is passed. By means of the elliptical coil 235 wound spirally and the elongate core 236 having the recesses 236a, 236a, high frequency magnetic field is formed along the bead wire 206 embedded in the bead portion 204c. The coil 235 may have a circular spiral shape and the core 236 may be a circular plate having a ring-shaped recess. Heating efficiency is higher in the case where the elliptical spiral coil 235 and elongate core 236 are combined. Also, if the core 236 is not an integral body but is split into a center core 236b, middle cores 236c, 236c, and side cores 236d, 236d, then the magnetic flux density along the bead wire 206 is increased and the bead wire 206 can be heated more efficiently.

In the above constitution, process of heating the green tire 204 will be explained with reference to FIG. 15 The green tire 204 is moved horizontally by a transporting apparatus (not shown) to be positioned above the lower supporting plate 222, and then by lowering the upper supporting plate 221 vertically, the green tire 204 is held between the upper and the lower supporting plate 221, 222. Next, the green tire 204 rotates horizontally by the rotational driving apparatus (not shown) via the rotating shaft 224, as well as the pressure fluid flows from the pressure fluid supplying source 226 into the green tire 204 via the passage 225, thereby the green tire 204 is expanded to a predetermined shape.

Next, the local preheating coil 212 for the tread portion 204a (the first coil means) is advanced toward the green tire 204. At this time, a guiding means by the guide roller 215 is provided at both sides of the local preheating coil 212, and the distance between the local preheating coil 212 and the tread portion 204a, i.e. the steel belt 205 is maintained constant. Also, the local preheating coils 213, 213 (the second coil means) for the upper and the lower bead portions 204c, 204c are advanced toward the green tire 204.

And, respective preheating coils 212, 213, 213 are supplied with high frequency power from the high frequency power supply (not shown). The local preheating coil 212 for the tread portion supplied with high frequency power applies high frequency magnetic field to the tread portion 204a with high magnetic flux density, to induction-heat the steel belt 205 of the tread portion 204a efficiently. Particularly, since high frequency magnetic field is formed in the plane of a width direction with respective to the metal steel belt 205 of the tread portion 204a, a magnetic flux density passing through the metal steel belt 205 becomes large and a circumferential direction of the steel belt 205 of the tread portion 204a is induction-heated efficiently.

Meanwhile, the local preheating coils 213, 213 for the bead portion apply high frequency magnetic field to the upper and the lower bead portions 204c, 204c with high magnetic flux density, respectively, to induction-heat the bead wire 206 of the upper and the lower bead portions 204c, 204c efficiently. Particularly, in the case where the spiral local preheating coils 213, 213 are used, high frequency magnetic field is formed along the circumferential direction of the bead wire 206 (metal member) of the upper and the lower bead portions 204c, 204c. Accordingly, by applying sufficient alternating magnetic field to the bead wire 206, the bead portions 204c, 204c having large thickness where the temperature rising is delayed upon vulcanization, can be preheated sufficiently.

Since the green tire 204 has rotated horizontally, the local preheating coil 212 for the tread portion 204a and the local preheating coils 213, 213 for the bead portions 204c, 204c become a state of moving relatively along the green tire 204. Accordingly, even in the case that the local preheating coils 212, 213, 213 are not positioned correctly and high frequency magnetic field is applied non-uniformly to the tread portion 204a and the upper and the lower bead portions 204c, 204c of the green tire 204, it is possible to apply high frequency magnetic field for induction-heat uniformly over the whole green tire 204. Thereby, it is not necessary to assemble or process the preheating coils 212, 213, 213 with high precision, and operations for assembling and processing can be facilitated.

As shown in FIG. 15, in this embodiment, before vulcanizing the green tire 204 having metal members embedded therein, such as a ring-belt-shaped steel belt 205 or a wire-ring-shaped bead wire 206, the preheating method of the green tire in which high frequency magnetic field for induction-heat is formed with high precision along the metal members, is performed, so that the inside of the green tire where the temperature raising is mostly delayed upon vulcanization, is preheated while it is heated, thereby it is possible to complete the vulcanization in a short time. Specifically, at least one of the ring-belt-shaped steel belt 205 and the wire-ring-shaped bead wire 206 (metal members) respectively embedded in the inside of tire, that is, the tread portion 204a and bead portions 204c, 204c are heated by induction, so that particularly the inside of tire, that is the tread portion 204a and bead portions 204c, 204c having large thickness is efficiently preheated, thereby the vulcanization can be completed more surely in a short time.

In this embodiment, although the case that the metal members are embedded in the tread portion 204a and the bead portions 204c, 204c is explained, the present invention is not limited to this case, and can be applied to the case that the metal member is embedded in an optional portion having large thickness. Accordingly, for example, in the case where the metal members are embedded in the sidewall which become the sidewall portion, at least one of the metal member embedded in the tread portion 204a, the bead portions 204c, 204c and the sidewalls may be induction-heated.

In the green tire preheating apparatus 210, a moving means for rotating the green tire 204 is provided by the rotational driving apparatus that is not shown, but the present invention is not limited to this embodiment. Namely, the moving means may be a constitution comprising a moving means for relatively moving the local preheating coil in a circumferential direction of the green tire 204.

Also, in FIG. 15, the local preheating coil means 212 for the tread (the first coil means) is positioned between a pair of the green tires 204, 204, and is formed to preheat them at the same time. However, it is possible to preheat one green tire 204 using same local preheating coil means 212. At this time, if a ferrite core is disposed at the local preheating coil means 212 side opposite to the green tire 204, a magnetic flux at the side opposite to the green tire 204 is concentrated so that the heating efficiency can be increased.

The shape and disposing method of local preheating coil 212 for the tread portion 204a in the green tire preheating apparatus 210 may be constituted as shown in FIGS. 16 to 26.

Figure 18A:
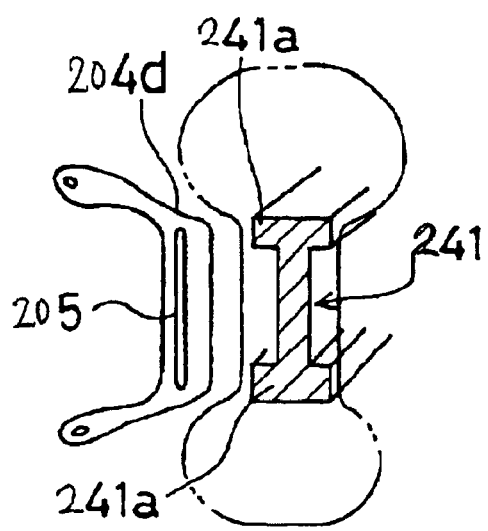
FIG. 18 shows the other shape example of a center core of the first coil means.
Figure 18B:
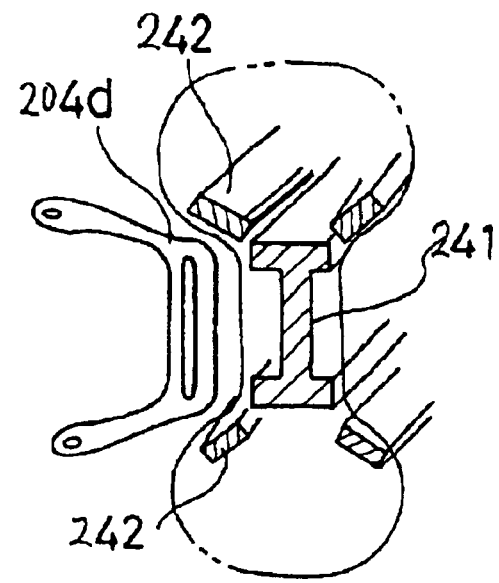

As shown in FIG. 18, by adding a deformed portion to a shape of the center core, heating of the shoulder portion 204d can be promoted. In FIG. 18(a), the center core 241 has protruded portions 241a, 241a heading toward the green tire 204 side, at above and below thereof, and high frequency magnetic field in a width direction of the steel belt 205 becomes high density near the shoulder portion 204d. Also, in FIG. 18(b), in addition to the center core 241 having the protruded portions 241a, 241a, that is, in addition to magnetic flux from the projected portions 241a, 241a, auxiliary cores 242, 242 are installed to the shoulder portion 204d. By means of the auxiliary cores, high frequency magnetic field in a width direction of the steel belt 205 becomes higher density near the shoulder portion 204d.

Figure 19:
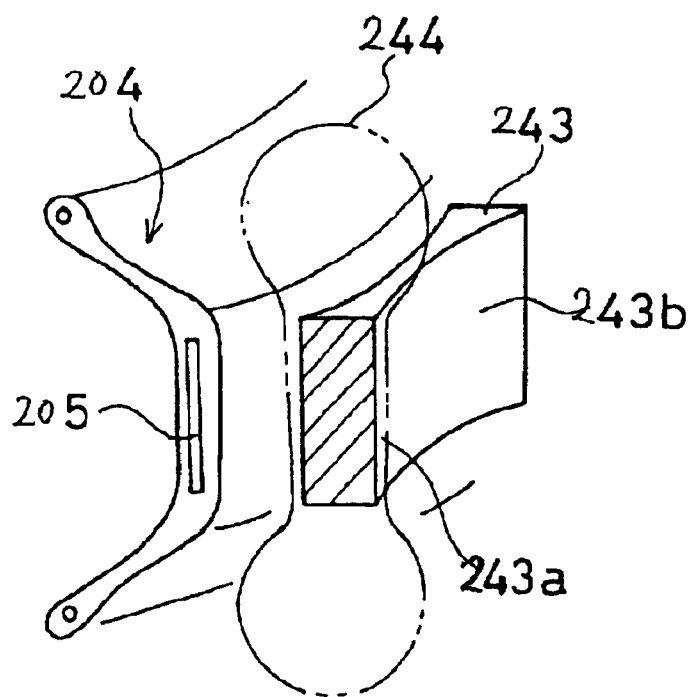
FIG. 19 shows another shape example of the center core of the first coil means.

As shown in FIG. 19, the center core 243 has a thick portion 243a and a thin portion 243b in a curved shape or stepped shape to be matched with R shape of the outer diameter of the green tire 204. By effectively using the magnetic field formed by the coil 244 to increase the heat generation efficiency of the steel belt 205, the green tire 204 is heated efficiently.

Figure 20:
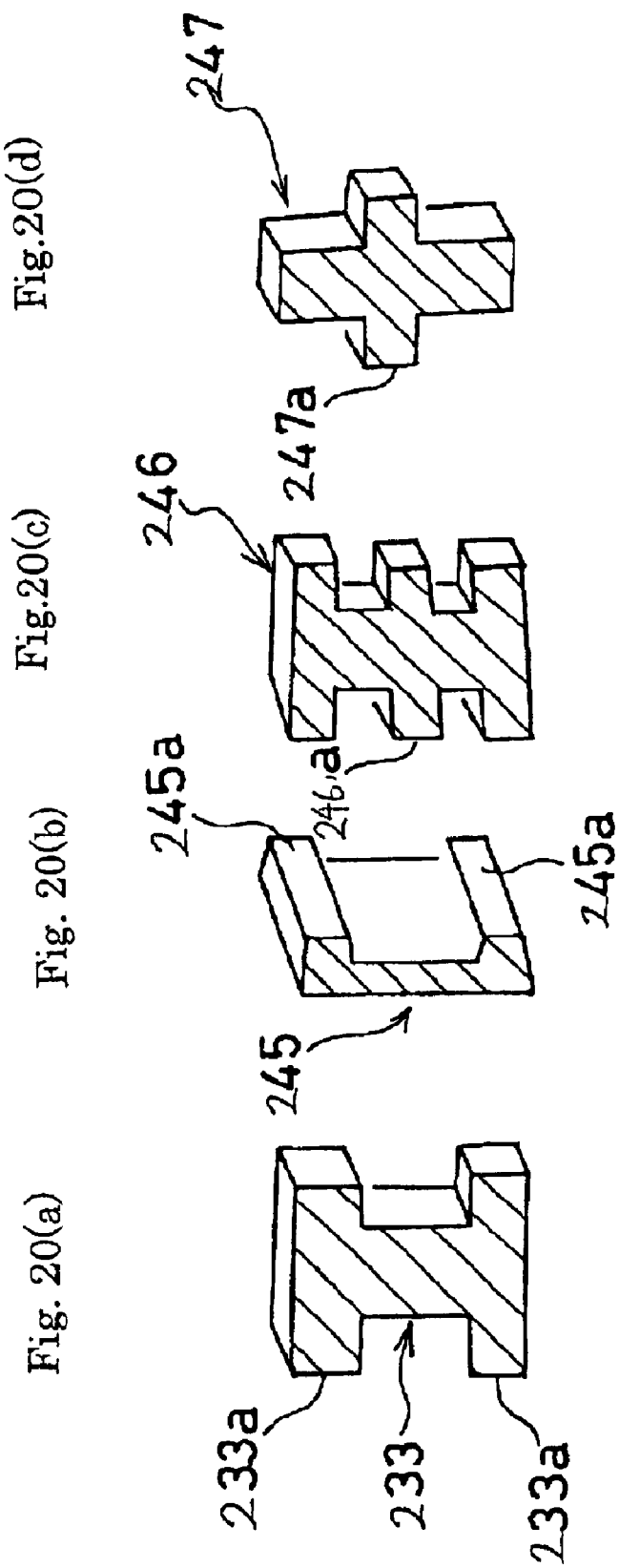
FIG. 20 shows the other shape example of a side core of the first coil means.

As shown in FIG. 20, by adding the deformed portion to the shape of the side core, it is possible to promote the heating of the shoulder portion 204d, etc. A side core 233 shown in FIG. 20(a) has protruded portions 233a, 233a heading toward the green tire similar to that explained in FIG. 16, but a side core 245 shown in FIG. 20(b) may have a protruded portion 245a, 245a heading toward the circumferential direction of the green tire. As a side core 246 shown in FIG. 20(c), by having a protruded portions 246a heading toward the green tire 204 at the center of a width direction, heating to the center portion of the tread portion 204a of the green tire 204 can be concentrated, similar to the shoulder portion 204d. Also, as a side core 247 shown in FIG. 20(d), by forming a protruded portions 247a only at the center of a width direction, heating to the center portion of the tread portion 204a of the green tire 204 can be concentrated. As such, in the case where high frequency magnetic field is corresponded in the surface direction of the steel belt 205 of the green tire 204, by simply providing suitable protruded portion in the side cores 233, 245, 246, 247, the heating level of the tread portion 204a and the shoulder portion 204d of the green tire 204 can be adjusted.

Figure 21:
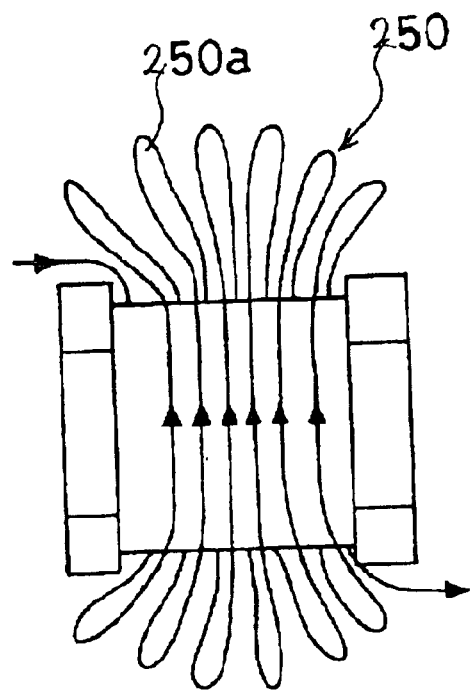
FIG. 21 shows the other shape example of a coil of the first coil means.

Next, a local preheating coil 250 for the tread portion shown in FIG. 21 will be explained in detail. A coil electric wire 250a at the hollow core portion is a shape of fin type, which is formed to a sector form to have a large distance between each other. Thereby, heat radiation area of the coil electric wire 250a is increased so that heat generation due to current from the coil electric wire 250a can be reduced.

Figure 22:
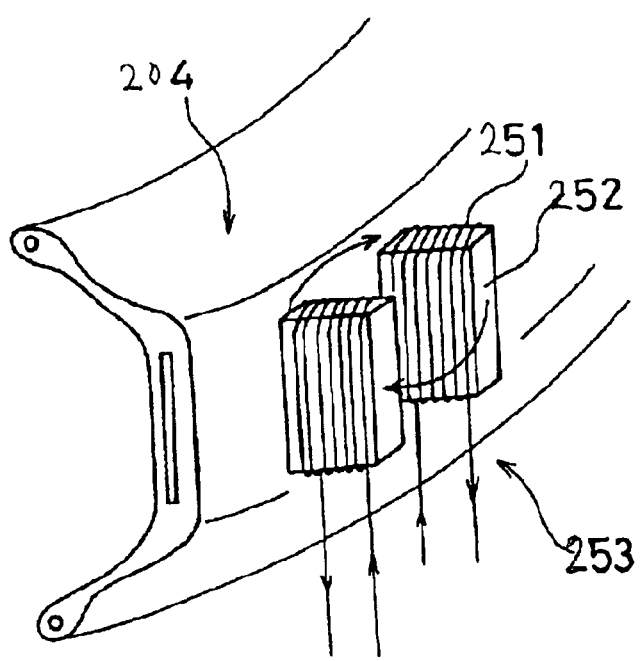
FIG. 22 shows the other example of the first coil means.

In the constitution shown in FIG. 22, high frequency magnetic field is formed in a circumferential direction of the green tire 204. A coil means 253 is formed, by arranging a rectangular core 252 wound with a coil 251 at a predetermined interval circumferentially. The winding directions with respect to two cores 252 are reversed each other, and high frequency magnetic field heading in the circumferential direction of the green tire 204 is formed between two cores 252.

Figure 23:
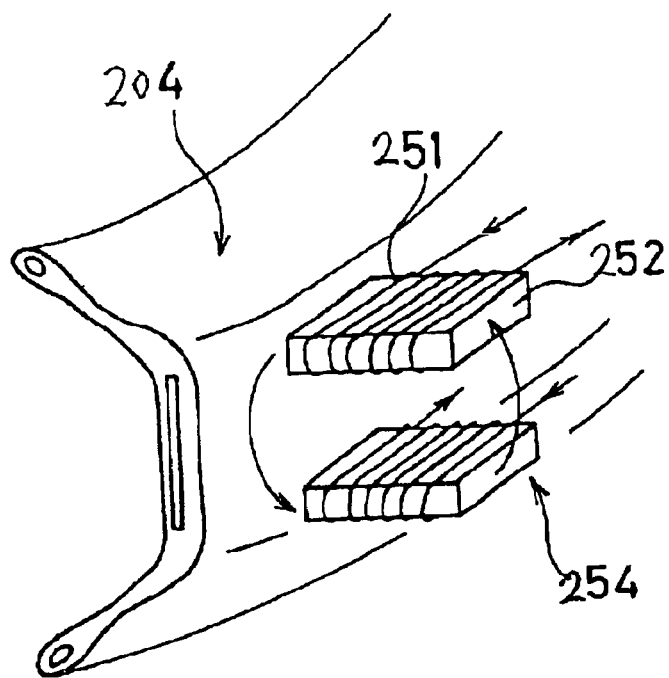
FIG. 23 shows another example of the first coil means.
Figure 24:
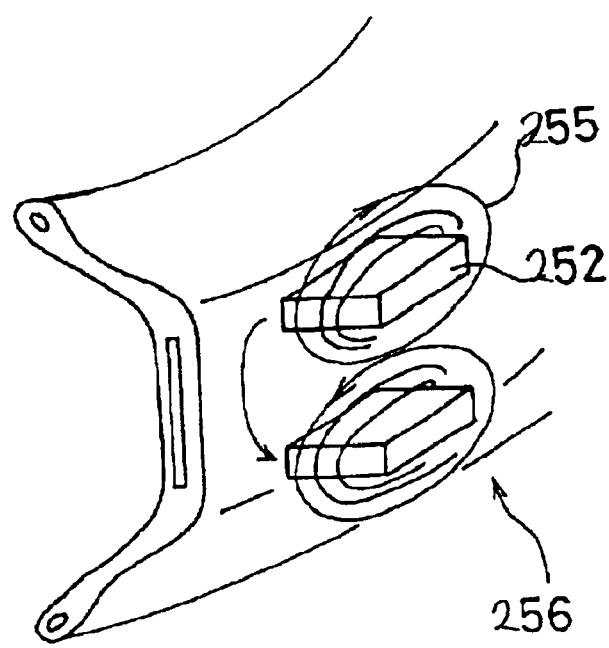
FIG. 24 shows another example of the first coil means.

In FIG. 23, a coil means 254 is formed, by arranging a pair of cores 252 shown in FIG. 22 at a predetermined interval in a width direction of the green tire 204. High frequency magnetic field heading in a width direction of the green tire 204 is formed between two cores 252. In FIG. 24, a coil 255 to be wound around the core 205 shown in FIG. 23 has a spiral shape, and a coil means 256 is formed by making the winding directions to be different at the upper and the lower cores 252. High frequency magnetic field heading in a width direction of the green tire 204 is formed between two cores 252.

Also, in FIGS. 22 to 24, two coil units of the coil means 253, 254, 256 can be disposed in the inclined direction between the circumferential direction and the width direction. Particularly, as shown in FIG. 7, since the metal wire of the steel belt 205 is disposed with an angle of 10~30° circumferentially, two coil units are disposed in this direction and high frequency magnetic field can be formed in the direction of the metal wire. Since the metal wire is disposed so as to intersect with an angle of ±10~30° circumferentially, by disposing two sets of coil means 253, 254, 256 having different directions at a predetermined interval circumferentially with respect to the green tire 204, high frequency magnetic field can be perfectly corresponded in the circumferential direction of the metal wire of the steel belt 205.

Figure 25:
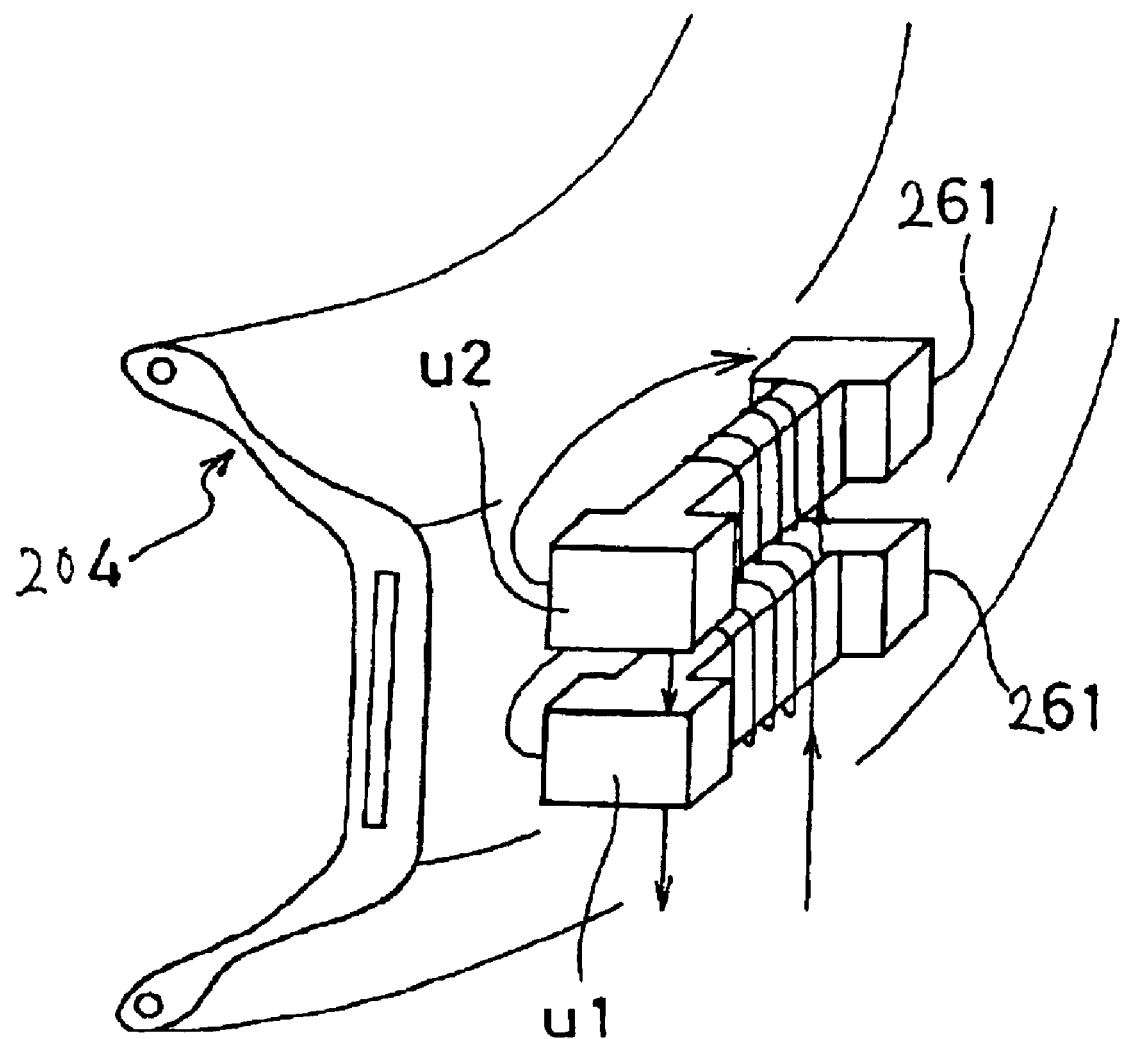
FIG. 25 shows an example of the first coil means split in a width direction.
Figure 26A:
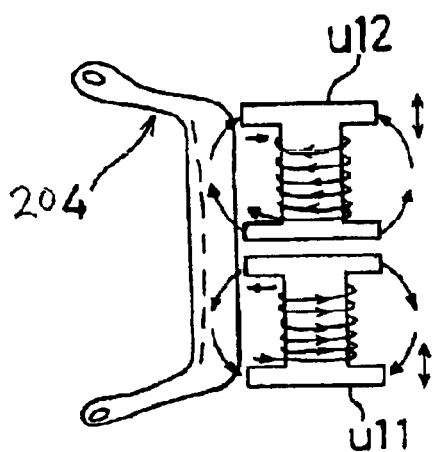
FIG. 26 shows an example of the first coil means split in a width direction.
Figure 26B:
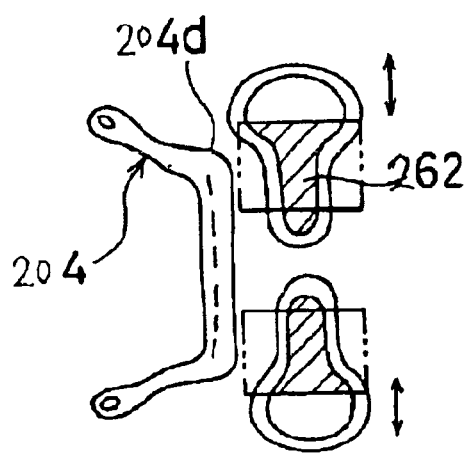
Figure 26C:
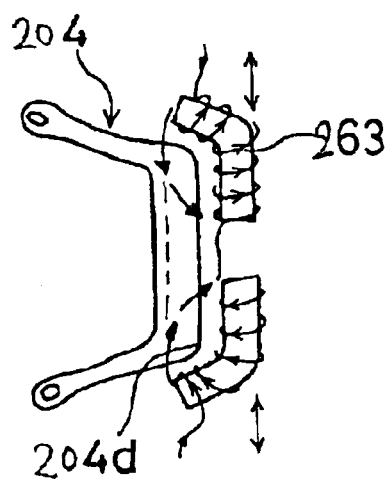
Figure 26D:
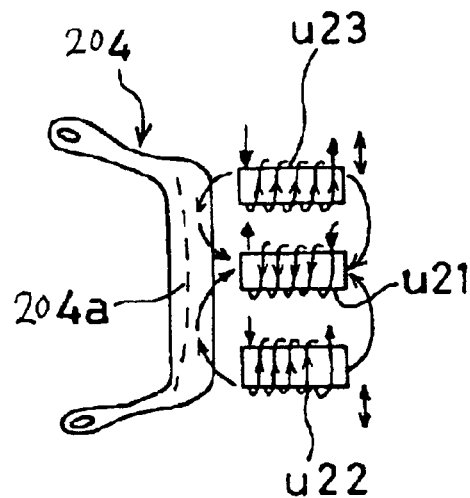

A local preheating coil for the tread portion 204a as shown in FIG. 25 will be explained in detail. Center cores 261, 261 are split into the upper and the lower two cores, and a coil 262 is spirally wound around the center cores 261, 261 in the same direction, respectively, and then two same coil units are arranged above and below in parallel. With the above constitution, even in the case that size of the green tire 204 changes and width of the metal member of the ring-belt-shaped steel belt 205 changes, since by relatively moving the split coil units U1, U2 in a width direction of the green tire 204, width of high frequency magnetic field heading in the circumferential direction of the green tire 204 can be adjusted, work for exchanging the local preheating coil every time when the size of the green tire 204 is changed is unnecessary, and the green tire 204 can be induction-heated effectively.

FIG. 26 shows an example managing the other width adjustment of the local preheating coil of the tread portion 204a. In FIG. 26(a), two coil units U11, U12 are arranged in a width direction of the green tire 204, and the distance between the coil units U11, U12 is adjusted corresponding to the size change of the green tire 204. In FIG. 26(b), shape of the center core 262 is changed from that in FIG. 25 and deformed toward the shoulder portion 204d, so that although the vertical distance between the coils units is changed, concentration of heating to the shoulder portion 204d is not changed. In FIG. 26(c) shape of the center core 263 is deformed so as to be curved along the shoulder portion 204d, so that although the vertical distance between the coil units is changed, concentration of heating to the shoulder portion 204d is not changed. FIG. 26(d) has three coil units consisting of an upper, a center and a lower units, in which position of the center coil unit U21 is not changed, and by changing the distance between the upper or the lower coil unit U22, U23 and the center coil unit U21, although the position of the coil unit U22, U23 is changed due to size change of the green tire 204, heating to the tread portion 204a is not reduced by the coil unit U21.

Embodiments are not limited to above, and for example may be practiced by changing as described below.

(1) In FIG. 15, the local preheating coil 212 is not limited to only one set for the green tire 204, and by disposing at least two sets of local preheating coils 212 on the outer circumference of the green tire 204, it is possible to form high frequency magnetic field along almost of the outer circumference of the green tire 204. The set of local preheating coils 213, 213 for the bead portions is also not limited to only each one set for the upper and the lower bead portions 204c, 204c, and at least two sets of the local preheating coils 213, 213 for the bead portion can be disposed along the upper and the lower bead portions 204c. Also, by changing the number of coils such that the local preheating coils 212 for the tread is one set and the local preheating coils 213, 213 for the bead portions are at least two sets, the preheating to the tread portion 204a and the bead portions 204c can be balanced. Also, in the case where the local preheating coil 212 is used exclusively for one green tire 204, it is preferred to concentrate the magnetic flux at the opposite side by a ferrite core.

(2) Also, frequency of high frequency power supply to be applied to coils of the local preheating coil 212 for the tread and the local preheating coil 213 for the bead portion is properly selected in a range of 50 Hz~100 kHz, preferably 10~50 kHz. Since constitutions of the inner steel belt 205 and the bead 206 are different depending on the type or size of the green tire 204, the frequency suitable for forming high frequency magnetic field along the extending direction of the metal member is selected in the above range.

In the above embodiments, the heating apparatus of the present invention is explained mainly regarding to a preheating apparatus, but may be applied to the vulcanizing apparatus by changing its shape suitably.

EXAMPLE

Figure 27:
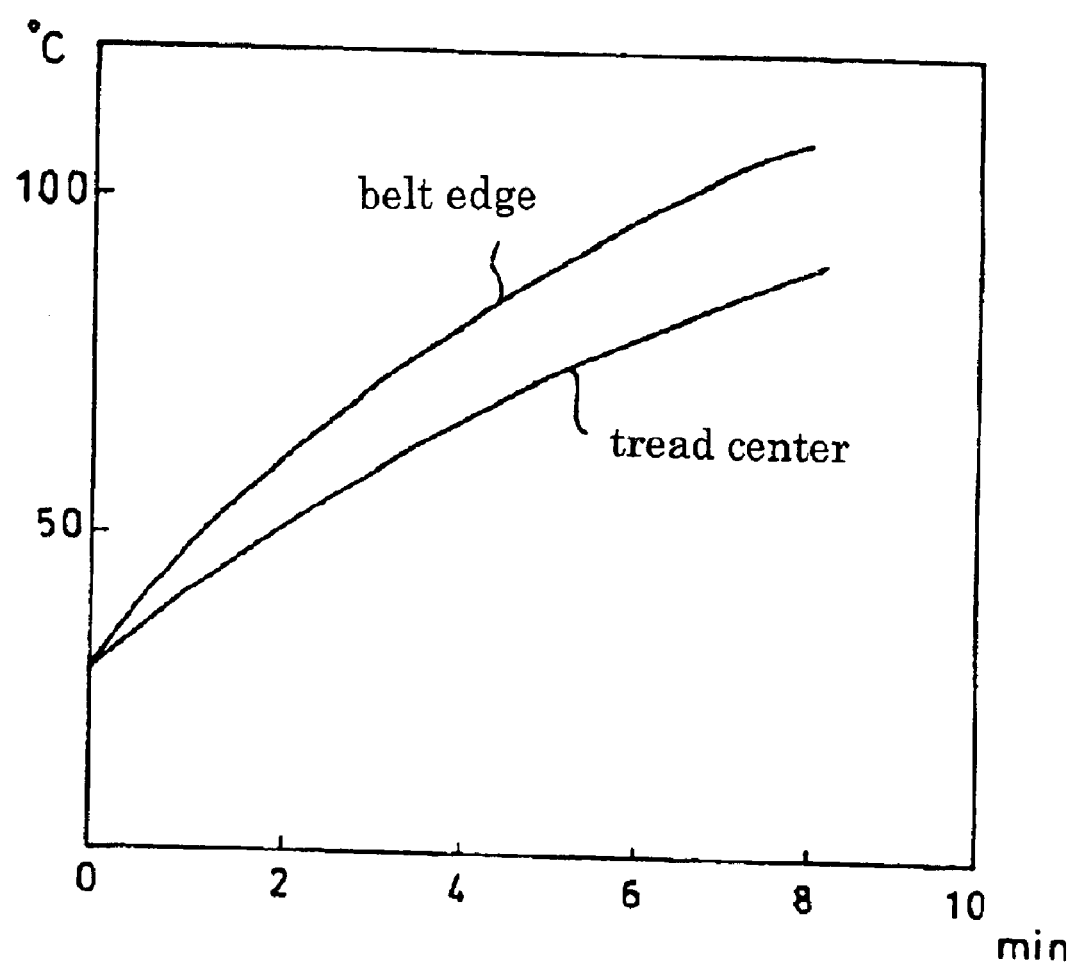
FIG. 27 is a graph showing an example of heating a tread portion by the first coil means.

When the green tire was heated with electromagnetic induction-heating of 30 kHz using the first coil means of FIG. 16, temperature rising curve at a center portion of the tread portion 204a and a belt edge of the shoulder portion 204d is shown in FIG. 27. Since the side core 233 of the coil means of FIG. 16 has the protruded portions 233a, 233a, temperature rising curve at the belt edge is above the temperature rising curve at the center portion. If the side core 233 does not have the protruded portions 233a, 233a, temperature rising curve at the belt edge and the temperature rising curve at the center portion are reversed. As such, according to the extent of the protruded portions 233a, 233a of the side core 233, the green tire 204 can be heated uniformly in a width direction.

Figure 28:
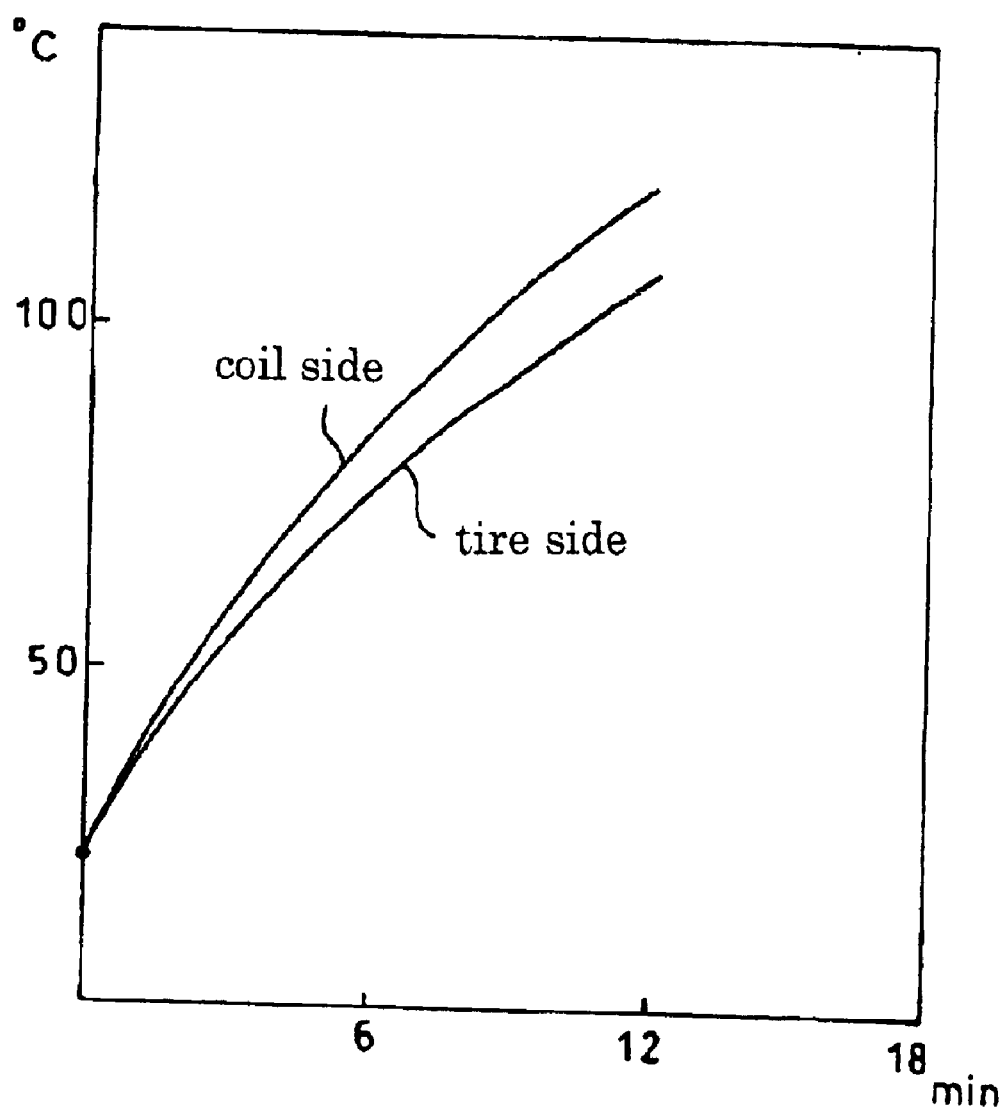
FIG. 28 is a graph showing an example of heating a bead portion by the second coil means.

When the green tire was heated with electromagnetic induction-heating of 30 kHz using the second coil means of FIG. 17, temperature rising curve at a coil side of the bead portion 204c and a tire side is shown in FIG. 28. It is found that heating of which temperature difference between the inside and the outside is small can be realized, even though the wire-ring-shaped metal member may be used.

Although technical spirits of the present invention has been disclosed with reference to the appended drawings and the preferred embodiments of the present invention corresponding to the drawings has been described, descriptions in the present specification are only for illustrative purpose, not for limiting the present invention.

Also, those who are skilled in the art will appreciate that various modifications, additions and substitutions are possible without departing from the scope and spirit of the present invention. Therefore, it should be understood that the present invention is limited only to the accompanying claims and the equivalents thereof, and includes the aforementioned modifications, additions and substitutions.

What is claimed is:

1. An apparatus for heating a green tire by generating heat to a metal member embedded in the green tire using electromagnetic induction, comprising:

a local heating coil for forming a high frequency magnetic field along a portion of an extending direction of said metal member;

a high frequency power supply for supplying high frequency power to said local heating coil;

moving means for moving said local heating coil relatively in the extending direction of said metal member; and pressing means for pressing the inside of the green tire.

2. The apparatus for heating a green tire according to claim 1, wherein said local heating coil forms a high frequency magnetic field along a portion of a facial direction of a ring-belt-shaped metal member embedded in said tread portion of said green tire.

3. The apparatus for heating a green tire according to claim 2, wherein said local heating coil is installed apart in a width direction of said tread portion and is constructed to have installation interval variable in response to the green tire size.

4. The apparatus for heating a green tire according to claim 1, wherein said moving means is a rotational driving mechanism for rotating said green tire about a center axis thereof.

5. The apparatus for heating a green tire according to claim 4, wherein said local heating coil is placed between a pair of green tires so that it can heat said pair of green tires simultaneously.

6. An apparatus for heating a green tire by generating heat to a metal member embedded in the green tire using electromagnetic induction, comprising: a local heating coil for forming high frequency magnetic field along a portion of extending direction of said metal member; a high frequency power supply for supplying high frequency power to said local heating coil; and moving means for moving said local heating coil relatively in the extending direction of said metal member, wherein said local heating coil forms high frequency magnetic field along a portion of peripheral direction of a wire-ring-shaped metal member embedded in a bead portion of said green tire.

7. The apparatus for heating a green tire according to claim 6, wherein said local heating coil comprises a spiral coil and a core arranged on a side of said spiral coil.

8. The apparatus for heating a green tire according to claim 7, wherein said spiral coil has an approximately elliptical shape following said wire-ring-shaped metal member and said core has a square shape following said wire-ring-shaped metal member.

9. The apparatus for heating a green tire according to claim 6, wherein said moving means is a rotational driving mechanism for rotating said green tire about a center axis thereof.

10. The apparatus for heating a green tire by generating heat to a metal member embedded in the green tire using electromagnetic induction, comprising:

a local heating coil for forming a high frequency magnetic field along a portion of an extending direction of said metal member;

a high frequency power supply for supplying high frequency power to said local heating coil; and moving means for moving said local heating coil relatively in the extending direction of said metal member, wherein said local heating coil comprises a center core, a side core and a coil, at least one of said center core, said side core and said coil have a deformed portion, and said deformed portion is formed so as to concentrate high frequency magnetic field to a tread portion of said green tire or a shoulder portion continued from said tread portion.

11. The apparatus for heating a green tire according to claim 10, wherein said center core is formed as a curved surface or stepped shape so as to follow a periphery of said green tire.

12. The apparatus for heating a green tire according to claim 10, further comprises an auxiliary core, said auxiliary core being disposed so as to raise the density of the high frequency magnetic field of said shoulder portion in a high precision.

13. An apparatus for heating a green tire by generating heat to a metal member embedded in the green tire using electromagnetic induction, comprising: a local heating coil for forming high frequency magnetic field along a portion of extending direction of said metal member; a high frequency power supply for supplying high frequency power to said local heating coil; and moving means for moving said local heating coil relatively in the extending direction of said metal member, wherein said local heating coil is provided so as to heat one green tire, and a ferrite core is disposed opposite to said green tire with respect to said local heating coil.

* * * * *

UNITED STATES PATENT AND TRADEMARK OFFICE
CERTIFICATE OF CORRECTION

PATENT NO.    : 6,818,872 B2
DATED         : November 16, 2004
INVENTOR(S)   : Mitamura et al.

It is certified that error appears in the above-identified patent and that said Letters Patent is hereby corrected as shown below:

<u>Title page,</u>
Item [73], Assignee, should read:
-- [73] Assignee: Kabushiki Kaisha Kobe Seiko Sho
                (Kobe Steel, Ltd.), Kobe (JP) --

Signed and Sealed this

Eighth Day of February, 2005

JON W. DUDAS
*Director of the United States Patent and Trademark Office*